(12) United States Patent
De Graaff et al.

(10) Patent No.: US 8,312,806 B2
(45) Date of Patent: *Nov. 20, 2012

(54) SYSTEM FOR PREPARING A BEVERAGE SUITABLE FOR CONSUMPTION, AND EXCHANGEABLE HOLDER FOR SUCH SYSTEM

(75) Inventors: Gerbrand Kristiaan De Graaff, Lisse (NL); Hendrik Cornelis Koeling, Amersfoort (NL); Ka Cheung Tsang, Amsterdam (NL); Ralf Kamerbeek, Utrecht (NL)

(73) Assignee: Koninklijke Douwe Egberts B.V. (NL)

( * ) Notice: Subject to any disclaimer, the term of this patent is extended or adjusted under 35 U.S.C. 154(b) by 803 days.

This patent is subject to a terminal disclaimer.

(21) Appl. No.: 12/297,631

(22) PCT Filed: Apr. 19, 2007

(86) PCT No.: PCT/NL2007/050167
§ 371 (c)(1),
(2), (4) Date: Feb. 18, 2009

(87) PCT Pub. No.: WO2007/120050
PCT Pub. Date: Oct. 25, 2007

(65) Prior Publication Data
US 2009/0211456 A1 Aug. 27, 2009

(30) Foreign Application Priority Data

Apr. 19, 2006 (NL) .................................... 1031622
Jun. 29, 2006 (NL) .................................... 1032091

(51) Int. Cl.
*A47J 31/41* (2006.01)

(52) U.S. Cl. ................ 99/295; 99/323; 206/5; 206/222; 239/317; 239/316

(58) Field of Classification Search ................... 99/323, 99/295; 239/310, 316, 317; 206/0.5, 219, 206/222
See application file for complete search history.

(56) References Cited

U.S. PATENT DOCUMENTS

| 4,136,202 | A | | 1/1979 | Favre |
| 5,472,719 | A | | 12/1995 | Favre |
| 5,615,801 | A | | 4/1997 | Schroeder et al. |
| 5,842,645 | A | * | 12/1998 | Degongre et al. ............. 239/312 |
| 6,419,166 | B1 | * | 7/2002 | Brzezinski et al. ........... 239/310 |

(Continued)

FOREIGN PATENT DOCUMENTS

EP 1 462 042 B1 9/2004
(Continued)

OTHER PUBLICATIONS

U.S. Appl. No. 12/297,619, filed Oct. 17, 2008, De Graaff et al.
(Continued)

*Primary Examiner* — Reginald L Alexander
(74) *Attorney, Agent, or Firm* — Foley & Lardner LLP

(57) ABSTRACT

A system for preparing a predetermined amount of beverage suitable for consumption, provided with an exchangeable holder and an apparatus provided with a fluid dispensing device which is detachably connected to the holder for dispensing at least one amount of at least a first fluid such as water under pressure to the exchangeable holder, while the exchangeable holder is provided with at least one storage space which is filled with a second fluid such as a concentrate.

109 Claims, 9 Drawing Sheets

U.S. PATENT DOCUMENTS

| | | | |
|---|---|---|---|
| 6,698,333 B2 * | 3/2004 | Halliday et al. | 99/295 |
| 7,328,651 B2 * | 2/2008 | Halliday et al. | 99/295 |
| 7,640,843 B2 * | 1/2010 | Halliday et al. | 99/295 |
| 7,650,830 B1 * | 1/2010 | Lessis | 99/279 |
| 7,878,108 B2 * | 2/2011 | Mock et al. | 99/295 |
| 2004/0055948 A1 * | 3/2004 | Blum et al. | 210/435 |

FOREIGN PATENT DOCUMENTS

| | | |
|---|---|---|
| GB | 2023086 A | 12/1979 |
| NL | 7215523 | 5/1974 |
| WO | WO 01/21292 A1 | 3/2001 |
| WO | WO 02/074143 A2 | 9/2002 |
| WO | WO 2005/019093 A3 | 3/2005 |
| WO | WO 2005/063093 A1 | 7/2005 |
| WO | WO 2005/070816 A1 | 8/2005 |
| WO | WO 2006/005401 A3 | 1/2006 |
| WO | WO 2006/043803 A3 | 4/2006 |
| WO | WO 2007/120045 A2 | 10/2007 |
| WO | WO 2007/120046 A2 | 10/2007 |
| WO | WO 2007/120047 A2 | 10/2007 |
| WO | WO 2007/120048 A2 | 10/2007 |
| WO | WO 2007/120049 A2 | 10/2007 |
| WO | WO 2007/120051 A2 | 10/2007 |
| WO | WO 2007/120052 A2 | 10/2007 |

OTHER PUBLICATIONS

U.S. Appl. No. 12/297,629, filed Oct. 17, 2008, Koeling et al.
U.S. Appl. No. 12/226,401, filed Oct. 17, 2008, De Graaff et al.
U.S. Appl. No. 12/297,623, filed Oct. 17, 2008, De Graaff et al.
U.S. Appl. No. 12/297,625, filed Oct. 17, 2008, De Graaff et al.
U.S. Appl. No. 12/226,399, filed Oct. 17, 2008, De Graaff et al.
U.S. Appl. No. 12/297,618, filed Oct. 17, 2008, De Graaff et al.
International Search Report for International Application No. PCT/NL2007/050167; mailing date Nov. 27, 2007; 4 pages.

* cited by examiner

SYSTEM FOR PREPARING A BEVERAGE SUITABLE FOR CONSUMPTION, AND EXCHANGEABLE HOLDER FOR SUCH SYSTEM

CROSS-REFERENCE TO RELATED APPLICATIONS

The present application is a national phase application of International Application No. PCT/NL2007/050167 filed on Apr. 19, 2007 titled "SYSTEM FOR PREPARING A BEVERAGE SUITABLE FOR CONSUMPTION, AND EXCHANGEABLE HOLDER FOR SUCH SYSTEM", which claims priority to Netherlands Application No. NL 1031622, filed on Apr. 19, 2006, and Netherlands Application No. NL 1032091, filed on Jun. 29, 2006, the full disclosures of all three are hereby incorporated herein by reference.

BACKGROUND

The invention relates to a system for preparing a predetermined amount of beverage suitable for consumption, provided with an exchangeable holder and an apparatus provided with a fluid dispensing device which is detachably connected to the holder for dispensing at least one amount of at least a first fluid, such as a liquid and/or a gas, in particular such as water and/or steam, under pressure to the exchangeable holder, while the exchangeable holder is provided with at least one storage space which is filled with a second fluid such as a concentrate.

The invention further relates to an exchangeable holder designed to be connected to an apparatus provided with a fluid dispensing device for dispensing at least a first fluid, such as a gas and/or liquid, under pressure to the exchangeable holder for preparing a beverage suitable for consumption, while the exchangeable holder is provided with at least one storage space filled with a second fluid such as a concentrate.

Such a system and such an exchangeable holder are known per se.

With the known system, the apparatus is provided with, for instance, a needle which, in use, is pierced through a wall of the storage space for supplying the first fluid to the storage space. In the storage space, the first fluid and the second fluid mix together so that the beverage suitable for consumption is obtained which can then flow from the apparatus to be consumed.

A drawback of the known system is that the strength of the amount of beverage which is dispensed can vary in an uncontrollable manner. The fact is that if, at the start of the preparation of the beverage, the storage space still comprises relatively much of the second fluid, the beverage leaving the exchangeable holder will comprise a relatively high concentration of the second fluid and comprise a relatively low concentration of the first fluid. By contrast, at the end of the preparation cycle, the beverage that flows from the holder will comprise a relatively low concentration of the second fluid and a relatively high concentration of the first fluid. Further, with the known system, it is not possible to vary the properties of the beverage in a user-friendly manner, other than by varying the type of first fluid, the type of second fluid and/or the amount of the first fluid or the second fluid. The object of the invention is to provide a system with which, if desired, the above-mentioned drawbacks can be prevented and, furthermore, other advantages can be realized.

SUMMARY

Accordingly, the system according to the invention is characterized in that the holder is further provided with at least a first mixing chamber, at least one outflow opening which is in fluid communication with the first mixing chamber for dispensing the beverage from the first mixing chamber, while, in use, there is at least one fluid communication between the storage space and the first mixing chamber for dispensing the second fluid to the first mixing chamber, the holder comprising at least one inlet opening which is detachably connected to an outlet opening of the fluid dispensing device for supplying the first fluid to the first mixing chamber, the system further being provided with a dosing device which is designed for supplying the second fluid in a dosed manner from the storage space to the first mixing chamber, by supplying a third fluid, such as a gas or a fluid, in a controlled manner, under pressure, to the second fluid in the storage space (so that the third fluid applies a pressure and/or force to the second fluid), while the fluid dispensing device is designed for supplying the first fluid under pressure to the first mixing chamber, so that in the first mixing chamber the first fluid and the second fluid mix together for obtaining the beverage which, then, leaves the exchangeable holder via the outflow opening. Mixing can, for instance, also be understood to mean that the second fluid dissolves in the first fluid, or that the second fluid is diluted by the first fluid.

As, presently, the second fluid is dispensed in a dosed manner from the storage space to the first mixing chamber, the concentration of the second fluid in the beverage leaving the first mixing chamber can be accurately regulated. The fact is that the second fluid is dispensed to the first mixing chamber in a dosed manner. The first fluid too can be dispensed in a dosed manner by the fluid dispensing device to the first mixing chamber, so that consequently, the properties of the beverage formed by mixing the first fluid and the second fluid in the first mixing chamber can be well determined. Through controllable supply, under pressure, of a third fluid to the second fluid in the storage space, it applies that the dosing device is a controllable, active dosing device for supplying the second fluid to the first mixing chamber through application of an increased pressure or force to the second fluid. Supplying the second fluid to the first mixing chamber can then be regulated at wish. When supplying the third fluid under pressure to the storage space, the third fluid will apply a pressure and/or force to the second fluid. As a result, the third fluid will be forced via the fluid communication to the first mixing chamber. In use, the third fluid will effectively urge the second fluid from the storage space to the first mixing chamber. Here, the second fluid is then pressed or urged from the storage space by the third fluid.

In particular, it holds here that the system is further provided with a control device for controlling the dosing device and the fluid dispensing device. The dosing device and the fluid dispensing device can, for instance, be controlled independently of each other by the control device.

More in general it holds, that the system is designed such that the fluid dispensing device and the dosing device can supply the first fluid and the second fluid, respectively, to the first mixing chamber independently of each other. In this manner, the preparation of the beverage can be varied as desired, by regulating the amount and the period of supply of the first and second fluid, independently of each other.

The third fluid can comprise a gas and/or a liquid. With the aid of, for instance, the gas, the storage space can thus be blown out well. The gas will then remain in the storage space above the second fluid so that, through supply of more gas to the storage space, the second fluid is forced from the storage space. If, after use, the holder has been removed from the system, the gas can, if necessary, escape from the holder in a simple manner.

Instead of a gas, the third fluid can, as stated, also be a liquid. If, for instance, the second fluid is a liquid too and, for instance, the specific weight of the liquid of the third fluid is lower than that of the second fluid, then, when the third fluid is supplied to the storage space above the second fluid, it can force the second fluid effectively in downward direction from the storage space to the first mixing chamber. As a rule, in the storage space, the third fluid will remain above the second fluid. It may also happen that, apart from the second fluid, also, the third fluid enters the first mixing chamber, which is not a problem when the third fluid is, for instance, a gas or a liquid that can be incorporated in the beverage. The second fluid and the third fluid are such that the third fluid can force the second fluid from the (respective) storage space.

It is preferred that in use, the third fluid enters the storage space via an uppermost point of the storage space, viewed in vertical direction. As the entrance of the third fluid proceeds via the uppermost point of the storage space, the third fluid will, at all times, be present above the second fluid in the storage space. Therefore, the third fluid, for instance air, is not blown into the second fluid, for instance coffee concentrate, so that the formation of froth or the formation of air bubbles in the concentrate is prevented. Froth or air bubbles in the concentrate result in the concentrate remaining behind in the storage space, which is undesirable with respect to the accurate dosing of the second fluid to the mixing chamber.

In a further elaboration of the invention, the fluid communication, which is provided, in use, between the storage space and the mixing chamber, connects the storage space to the mixing chamber at a lowest point, viewed in vertical direction. As a result, the third fluid will always remain above the second fluid until all the second fluid has been forced from the storage space. As a result, the complete emptying of the storage space is further promoted and a constant dosing of the concentrate to the mixing chamber is ensured. Preferably, the lowest point and the uppermost point of the storage space are situated substantially opposite each other.

It is preferred that the system be provided with a needle which, in use, is pierced through a wall of the holder, more particularly through a wall of the storage space or through a wall of the holder at a position below which there is a space which is in fluid communication with the storage space, for supplying the third fluid to the second fluid in the storage space. Piercing with such a needle is reliable and can be controlled in a simple and reliable manner. The needle can cooperate with an at least locally weakened area of a wall of the storage space for piercing the needle, in use, through this area. For instance, a hollow needle can be used through which the third fluid can flow.

In a further elaboration of the invention, the needle can be provided all around with a sealing element, for instance a sealing tube or sealing ring, designed for cooperation with the wall of the holder, more particularly with the wall of the storage space or with the wall of the holder at a position below which there is a space which is in fluid communication with the storage space, in order to realize a fluid-tight sealing between the needle and the wall. By means of such a sealing, no fluid will leak away at the connection between the needle and the wall, which is desirable for a good dosing, and is also favourable from a viewpoint of hygiene. According to a further elaboration of the invention, the wall can further comprise a conically extending opening for receiving, in use, the needle and the sealing element, while the conically extending opening has a greater diameter at a side proximal to the sealing element than at a side remote from the sealing element. Such a construction of the opening ensures that, also in case of dimensional deviations within certain tolerances in the package, always, a fluid-tight sealing is obtained. The fact is that an outer side of the sealing element always in fits the conical opening in a form-locking manner.

It further preferably holds that the system is further provided with a restriction which is included in a fluid flow path which extends, via the outlet opening of the fluid dispensing device, the inlet opening of the holder and the first mixing chamber, from the fluid dispensing device to the outflow opening. With the restriction, for instance a jet and/or mist can be generated.

Preferably, it can also hold that the system is further provided with a restriction which is included in a fluid flow path which extends, via the outlet opening and the inlet opening, from the fluid dispensing device to the first mixing chamber. Here, it holds for instance, that the restriction is designed such that in use, with the restriction, a jet of the first fluid is generated which spouts into the first mixing chamber. As a result, the first and the second fluid can mix well in the first chamber.

It holds in particular that the system is further provided with at least one an air inlet opening for supplying air to the first mixing chamber so that, in use, air is whipped into the beverage for obtaining a beverage with a fine-bubble froth layer. According to a preferred embodiment, it holds here, that the air inlet opening forms part of the holder. As the air inlet opening forms part of the exchangeable holder, per exchangeable holder, for instance a size of the air inlet opening can be predetermined in order to determine, per exchangeable holder, how much air is whipped into the beverage. Depending on the type of beverage that is to be prepared, the size of the air inlet opening can be determined. If the second fluid is, for instance, a coffee concentrate and the first fluid, for instance, water, while it is intended that coffee with a small fine-bubble froth layer is prepared, the size of the air inlet opening can be chosen to be relatively small. If, by contrast, the exchangeable holder is filled with a second fluid in the form of, for instance, a milk concentrate, while, once more, the first fluid involves water, while it is intended that the beverage consists of frothed milk, the air inlet opening can be relatively large. As, in this example, the air inlet opening forms part of the exchangeable holder, the consumer needs not set anything. All this can be optimized in advance by the manufacturer.

In particular, it further holds that the restriction forms part of the holder. In this manner too, if desired, the size of the restriction can be predetermined depending on the type of beverage that is to be prepared and, in this example, for instance depending on the type of second fluid present in the storage space. If the restriction is, for instance, relative small, a relatively powerful jet of, for instance, water can be generated. Such a relatively powerful jet may be desirable when the second fluid comprises, for instance, a concentrate with a high viscosity. Here, due to the relatively powerful jet of the first fluid, the concentrate can dissolve well in the first fluid or be diluted well in the first fluid. In this manner too, it can be effected that in the first mixing chamber, a relatively strong turbulence of the liquids present there is formed so that, when the air inlet opening is present, relatively much air is whipped into the beverage. Hence, it is advantageous when the restriction forms part of the exchangeable holder.

According to an advanced embodiment, it holds that the exchangeable holder is provided with a plurality of storage spaces, separated from each other, and each filled with a second fluid. A first storage space can be filled with, for instance, a coffee concentrate while a second storage space is filled with a milk concentrate. In this manner, coffee with milk can be prepared when the first fluid comprises, for instance, water. In particular it holds here that the dosing device is designed for supplying the second fluids in a dosed manner from the storage spaces to the first mixing chamber by means of supplying the third fluid, in a controllable manner, under pressure, to the second fluids in the storage spaces. In particular it holds here that the dosing device is designed for supplying the third fluid to the second fluids in the storage spaces, independently, per storage space. As a result, per storage space, an individual dosing of the second fluid to the first mixing chamber can be carried out.

According to this preferred embodiment, it further holds that the dosing device is, in fact, provided with a plurality of dosing devices for dispensing second fluids in a dosed manner to the first mixing chamber with several dosing devices from mutually different storage spaces.

In this manner, first, from a first storage space a coffee concentrate can be supplied to the first mixing chamber, while the liquid dispensing device can supply the liquid in the form of, for instance, hot water to the first mixing chamber for preparing coffee. Thereupon, from the second storage space, milk concentrate is supplied in a dosed manner to the first mixing chamber, while also, the hot water is supplied to the first mixing chamber. Here, when further, an air inlet opening is present, air can be whipped in, so that a frothed milk is obtained. This frothed milk is then dispensed from the exchangeable holder. Thus, when the coffee and, then, the frothed milk are captured in the same mug, a good cappuccino can be prepared with a white froth layer which is formed by hot milk. The system, more particularly the holder, can further be provided with an adjustable air inlet opening. When dosing milk concentrate, this air inlet opening can, for instance, be opened, for obtaining frothed milk as discussed hereinabove. When dosing the coffee concentrate, the air inlet opening can be closed for obtaining coffee comprising virtually no froth. Then, the coffee and the frothed milk can be combined as described hereinabove for obtaining a cappuccino as described hereinabove.

According to an advanced embodiment, it holds that between each storage space on the one side, and the first mixing chamber on the other side, a seal is present which will open when the pressure which is applied by one of the fluids to the seal increases to above a particular value. In particular, here, at least a number of the seals will open at mutually different pressures. First, for instance, at least one seal will open when the pressure in the respective storage space increases to above a particular value belonging to the respective seal. At least a number of other seals will then not open yet. The result is that at the at least one seal which opens first, the second fluid can flow away to the mixing chamber so that in the first mixing chamber, under the influence of the liquid, a beverage can be generated. At a somewhat later moment, at least one of the other seals will open so that then, from the associated storage space, the respective second fluid can be dispensed to the first mixing chamber for preparing a different beverage. In this manner, first, for instance, coffee can be formed and then milk, in particular frothed milk, while first, the coffee can flow from the first mixing chamber into a container, such as a cup, whereupon the frothed milk can flow from the first mixing chamber into the cup, so that at least the froth of the milk will float on the coffee, resulting in the formation of an attractive cappuccino with white froth.

More in general it holds that the system is designed for dispensing fluids with at least two different dosing devices, from at least two storage spaces, at mutually different flow rates and/or during mutually different periods. Here, once again, the dosing devices can operate or be controlled independently of the fluid dispensing device. In other words, the first fluid and the second fluids can be dispensed in a controllable manner at mutually different flow rates and/or within mutually different periods.

The at least one air inlet can form part of the apparatus or of the holder. In particular it holds, that the at least one air inlet is provided with an adjustable valve for setting the size of the airflow. The valve can be controlled by the apparatus as well as by the consumer (manually). The valve can for instance be set depending on the type of beverage that is to be prepared. The exchangeable holder can for instance be provided with a code, readable by the apparatus, so that the apparatus knows which type of beverage is to be prepared, and, in this manner, the apparatus can, for instance, set the adjustable valve and/or control the fluid dispensing device for determining, for instance, the pressure, the amount, and the temperature of the liquid which is supplied to the exchangeable holder.

The holder according to the invention is characterized in that the holder is further provided with at least a first mixing chamber, at least one outflow opening which is in fluid communication with the first mixing chamber for dispensing the beverage from the first mixing chamber, at least one fluid communication between the storage space and the first mixing chamber for dispensing the first fluid to the first mixing chamber and at least one inlet opening which, in use, is detachably connected to an outlet opening of the fluid dispensing device for supplying the second fluid to the first mixing chamber, while the storage space forms part, at least partly, of a dosing device, the holder being designed in a manner such that, in use, a third fluid can be supplied to the second fluid in the storage space in a controllable manner, under pressure, with the apparatus, (so that the third fluid applies a pressure and/or force to the second fluid) for dispensing the second fluid in a dosed manner from the storage space to the first mixing chamber while, in use, the first fluid is also supplied under pressure to the first mixing chamber, so that the second fluid and the first fluid mix together for obtaining the beverage which then leaves the holder via the outflow opening.

In particular, it holds here that the holder is provided with means cooperating with the apparatus for supplying, in use, a third fluid to the second fluid in the storage space, while the means cooperating with the apparatus comprise, for instance, at least one locally weakened area of a wall of the storage space for piercing this area in use with a needle of the dosing device for supplying the third fluid to the second fluid in the storage space.

However, other means cooperating with the apparatus are also possible, for instance a valve in a wall of the storage space, which valve cooperates with a supply duct of the dosing device that can be connected to the valve, for supplying the third fluid to the second fluid in the storage space. Preferably, a supply opening of the storage space, formed by, for instance, a pierced wall of the storage space, or an extremity of the fluid communication which is present between a space below a wall of the holder and the storage space of the space, or the above-mentioned valve, is located at an uppermost point of the storage space, viewed in vertical direction. It is further also preferred that the fluid communication which, in use, is provided between the storage space and the mixing chamber of the holder, connects the storage space to the mixing chamber at a lowest point, viewed in vertical direction, while the lowest point and the uppermost point of the storage space are situated substantially opposite each other. Such a position of the supply opening of the third fluid to the storage space and the outlet opening of the second fluid from the storage space is particularly favourable for emptying the storage space maximally and dosing the second fluid to the mixing chamber accurately. The walls of the storage spaces can be at least partly rigid and/or at least partly flexible. Flexible parts of the walls can preferably not be stretched so that the storage spaces are not inflated by the supply of the third fluid. Conversely, when supplying the third fluid, the storage space can bulge somewhat while, upon further supply, the second fluid is forced from the storage space as discussed hereinabove.

BRIEF DESCRIPTION OF THE DRAWINGS

The invention will presently be further elucidated on the basis of the drawing.

In the drawing:

FIG. 2b shows a partly cutaway side view of the holder of FIG. 2a;

FIG. 2c shows a cross section of the holder according to FIG. 2a;

FIG. 3b shows a cross section of a part of the holder according to FIG. 3a;

FIG. 4b shows a cross section of the storage space of the holder according to FIG. 4a;

FIG. 5b shows a cross section of the fluid communication of the holder according to FIG. 5a;

FIG. 6b shows a cross section of the fluid communication of the holder according to FIG. 6a;

FIG. 7b shows a schematic cross section of a detail of the system of FIG. 7a.

DETAILED DESCRIPTION OF EXEMPLARY EMBODIMENTS

Figure 1A:
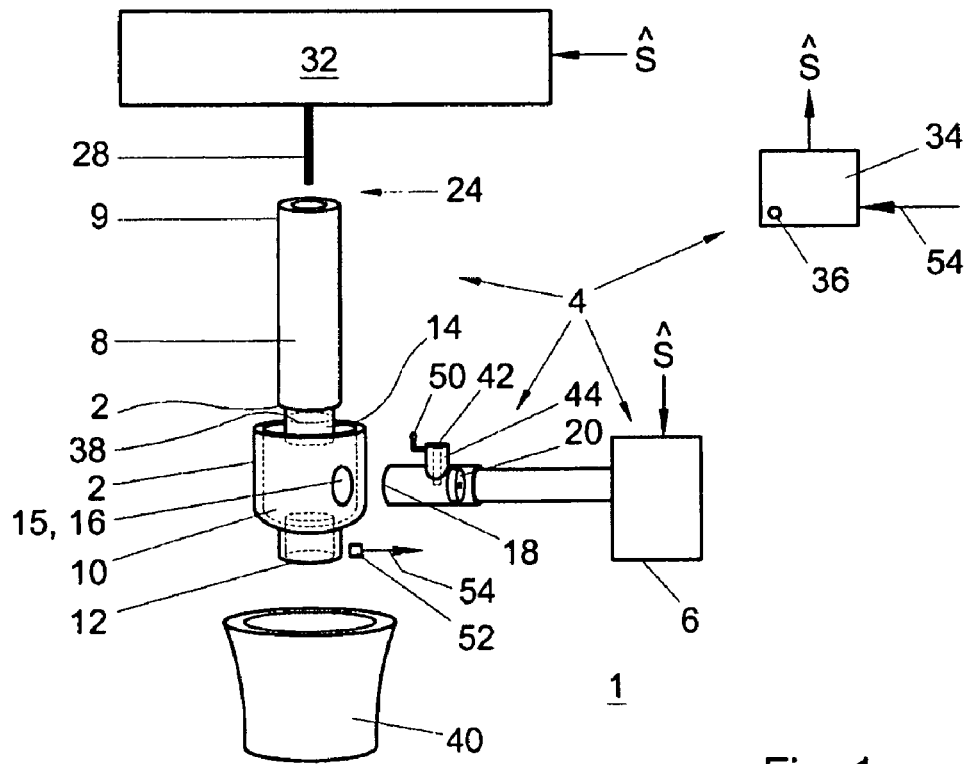
FIG. 1a shows a first embodiment of a system according to the invention, provided with a holder according to the invention.

In FIG. 1, reference numeral 1 indicates a system for preparing a predetermined amount of beverage suitable for consumption. The system (see FIG. 1a) is provided with an exchangeable holder 2 and an apparatus 4 which is provided with, inter alia, a fluid dispensing device 6 which is designed for dispensing, under pressure, at least one amount of at least a first fluid such as a liquid and/or a gas, more particularly such as water and/or steam. In this example, in use, the fluid dispensing device dispenses water.

Figure 1B:
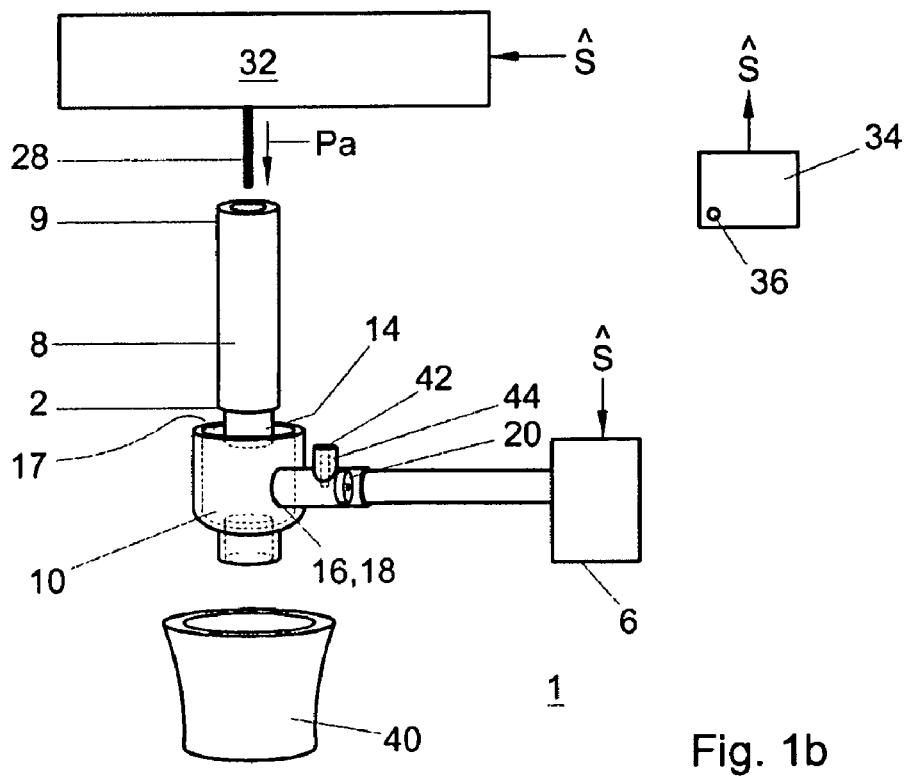
FIG. 1b shows the system according to FIG. 1a in operative condition.

The exchangeable holder 2 is provided with at least one storage space 8 which is filled with a second fluid such as a beverage, a concentrate or a powder. In this example, the storage space is formed by a rigid wall. This is, however, not required. In this example, a concentrate for preparing coffee is involved. The holder 2 is further provided with at least a first mixing chamber 10 and at least one outflow opening 12 which is in fluid communication with the first mixing chamber 10. The holder is further provided with a fluid communication 14 between the storage space 8 and the first mixing chamber 10. Furthermore, the holder is provided with at least one inlet opening 16 which is detachably connected to an outlet opening 18 of the fluid dispensing device 6. In FIG. 1a, the inlet opening 16 is not yet connected to the outlet opening 18. This is, however, the case in FIG. 1b. In this example, the inlet opening in FIG. 1a is still closed off by a sealing which can be removed, such as a removable seal. This also holds for the outflow opening 12. In use, both removable seals are removed whereupon the outlet opening 18 can be connected to the inlet opening 16 as shown in FIG. 1b.

In this example, the system is further provided with a restriction 20 which is included in a fluid flow path 21 which extends, via the outlet opening 18 of the fluid dispensing device 6, the inlet opening 16 and the first mixing chamber 10, from the fluid dispensing device to the outflow opening 12.

More particularly, it holds in this example that the restriction 20 is included in a fluid flow path 22 which extends, via the outlet opening 18 of the fluid dispensing device 6 and the inlet opening 16 of the exchangeable holder 2, from the fluid dispensing device to the first mixing chamber 10.

The storage space 8 forms at least a part of a dosing device, as will be further set forth hereinafter. In this example, this dosing device 24 is further provided with a needle 28 which, in use, is pierced through a wall of the storage space for supplying a third fluid to the second fluid in the storage space for dispensing the second fluid in a dosed manner to the first mixing chamber. The dosing device 24 is further provided with a fluid dispensing unit 32 which is connected to the needle 28. The fluid dispensing unit 32 and the needle 28 form part of the apparatus 4. In this example, the fluid dispensing unit 32 is at least detachably connectable via the needle 28 to the holder 2.

The apparatus 4 is further provided with a control device 34 for controlling the fluid dispensing device 6 and the fluid dispensing unit 32. To control the fluid dispensing device 6 and the fluid dispensing unit 32, the control device 34 generates control signals ŝ which are supplied to the fluid dispensing device 6 and the fluid dispensing unit 32.

The apparatus described heretofore works as follows. For the purpose of preparing a predetermined amount of beverage suitable for consumption, the exchangeable holder 2 is placed in the apparatus. Here, the storage space 8 of the exchangeable holder is placed under the needle 28. Also, as shown in FIG. 1b, the outlet opening 18 is connected to the inlet opening 16. The apparatus is now ready for use. By pushing, for instance, a button 36 of the control device 34, the control device provides for the fluid dispensing unit 32 to start moving the needle 28 in the direction of the arrow Pa. The result hereof is that the needle 28 is pierced through a wall of the storage space 8 and the third fluid is supplied under pressure to the second fluid in the storage space. As a result, the third fluid will apply a pressure and/or force to the second fluid. In this example, this will cause the pressure in the storage space to increase. It further applies that the first mixing chamber comprises a first entrance opening 15 and a second entrance opening 17 placed at a distance from the first entrance opening, while, in use, the first fluid enters the first mixing chamber via the first entrance opening and the second fluid and/or the third fluid enter the first mixing chamber via the second entrance opening. Here, the first entrance opening is in fact formed by the inlet opening 16. Further, the second entrance opening 17 is located at a top of the holder. It will be clear that in this example, a first fluid flow path along which the first fluid is supplied to the first mixing chamber is separated from a second fluid flow path along which the second fluid and, optionally, the third fluid is supplied to the first mixing chamber. Here, the fluid communication 14 may further be provided with a sealing 38 in the form of, for instance, a breakable skin 38 which tears open as a result of the increase of the pressure in the storage space 8 caused by the supply of the third fluid. As a result, in this example, the coffee concentrate will flow in a dosed manner from the storage space 8 via the fluid communication 14 to the first mixing chamber 10. Simultaneously, the control device 34 provides for the fluid dispensing device 6 to be activated. This results in that the fluid dispensing device 6 starts dispensing the first fluid, in this example water, under pressure. In this example, this water is hot water with a temperature of, for instance, 80-98° C. This hot water flows via the liquid flow path to the restriction 20. Having arrived at the restriction 20, a jet of the hot water is generated by means of the restriction 20. This jet spouts via the outlet opening 18 and the inlet opening 16 into the first mixing chamber 10. In the first mixing chamber 10, the hot water will start mixing well with the concentrate. Here, the flow rate at which the concentrate is supplied to the mixing chamber is controlled through the control of the fluid dispensing unit 32. The flow rate at which the hot water is supplied to the first mixing chamber is also controlled by the control device through the control of the fluid dispensing device. In the first mixing chamber, as a result of the jet, the concentrate will mix well with the hot water so that the beverage is formed. This beverage can then leave the outflow opening 12 and be captured in, for instance, a mug 40. As, with the system according to the invention, both the dosing of the concentrate over time and the dosing of the hot water over time can be controlled well, it can be ensured that the concentration of the amount of concentrate in the beverage can be accurately determined. Furthermore, it can be ensured that the beverage which, during its preparation, leaves the outflow opening 12 is of constant quality, i.e., the concentration of the concentrate in the beverage that is dispensed can be kept constant during dispensing, if desired. The fact is that the flow rate of the water and the flow rate of the concentrate supplied to the first mixing chamber can each, and if desired, be controlled independently of each other. Therefore, more generally, it holds that the system is designed such that the fluid dispensing device and the dosing device can supply the first fluid and the second fluid, respectively, to the first mixing chamber independently of each other. This entails that the size of the flow rate of the first fluid and the period during which the first fluid is dispensed are independent (in this example through control of the control device) of the size of the flow rate of the second fluid and the period during which the second flow rate is dispensed.

It further holds that the dosing device is a controllable and active dosing device for supplying the second fluid to the first mixing chamber by applying an increased pressure or force to the second fluid. Here, an active dosing device is understood to mean that the second fluid flows through the fluid communication from the storage space to the first mixing chamber as a result of the applied excess pressure or force on the side of the storage space.

In the example, the system is further provided with an air inlet opening 42. The air inlet opening 42 ensures that air is supplied to the first mixing chamber so that in use, air is whipped into the beverage for obtaining a beverage with a fine-bubble froth layer. Thus, a café crème can be obtained. In this example, the air inlet opening 42 is in fluid communication with the first mixing chamber 10 downstream of the restriction 20. In this example, the air inlet opening 42 terminates, via a fluid communication 44, into the fluid flow path 22. In this example it therefore holds that the air inlet opening and the restriction 20 each form part of the apparatus 4. This is, however, not required. It will be clear that the air inlet 42 and/or the supply channel 19 can form part of the exchangeable holder 2.

After the beverage, in this example coffee with a fine-bubble froth layer, has been prepared, the control device 34 stops the fluid dispensing device 6. The control device 34 also ensures that the third fluid is no longer supplied to the second fluid in the storage space and that the needle 28 is retracted from the respective wall of the storage space, i.e. in a direction opposite to that of the arrow Pa. Here, it may be such that the control device first provides that the dispensing of the second fluid to the first mixing chamber is stopped and that after that, the supply of the first fluid (in this example water) is stopped. Thus, the risk of the second fluid contaminating, for instance, the restriction 20 is reduced.

Figure 1C:
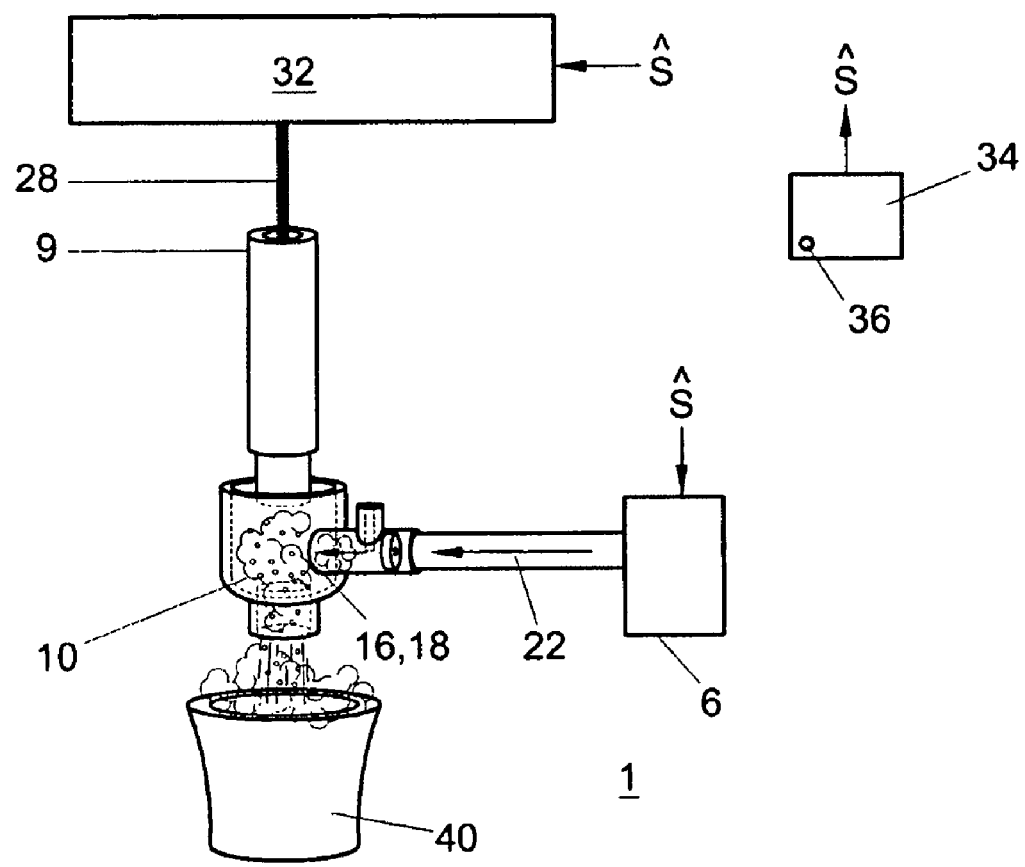
FIG. 1c shows the system according to FIG. 1a in operative condition.

FIG. 1c shows a situation where the needle 28 is pierced through a wall of the storage space 8 and the third fluid is supplied under pressure to the second fluid in the storage space. The situation shown occurs at the time when the control device 34 will stop the supply of hot water to the first mixing chamber, will no longer supply the third fluid to the second fluid in the storage space and will have the needle 28 be retracted from the respective wall of the storage space so that thereupon, the holder can be taken from the apparatus again.

After this, a user can remove the exchangeable holder and, if a new amount of beverage is to be prepared, place a new exchangeable holder in the apparatus 4. The new exchangeable holder can be provided with an entirely different type of second fluid such as, for instance, a milk concentrate. When, with the aid of the new exchangeable holder, milk is prepared in a manner comparable to that as described for the preparation of coffee based on coffee concentrate, in the prepared milk, no trace will be found of the previously prepared type of beverage. The fact is that the first mixing chamber forms part of the exchangeable holder and when a new exchangeable holder is placed in the apparatus, also an entirely new and, hence, clean first mixing chamber is placed in the holder. Therefore, contamination cannot be involved.

Figure 2A:
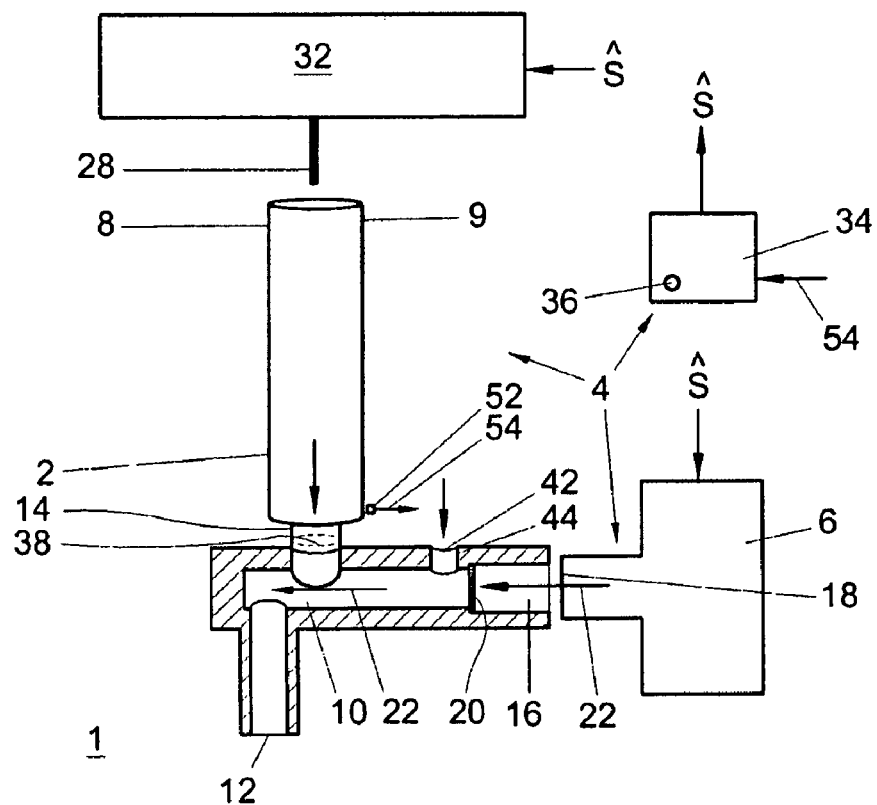
FIG. 2a shows a cross section of a second embodiment of a system according to the invention, provided with a holder according to the invention.
Figure 2B:
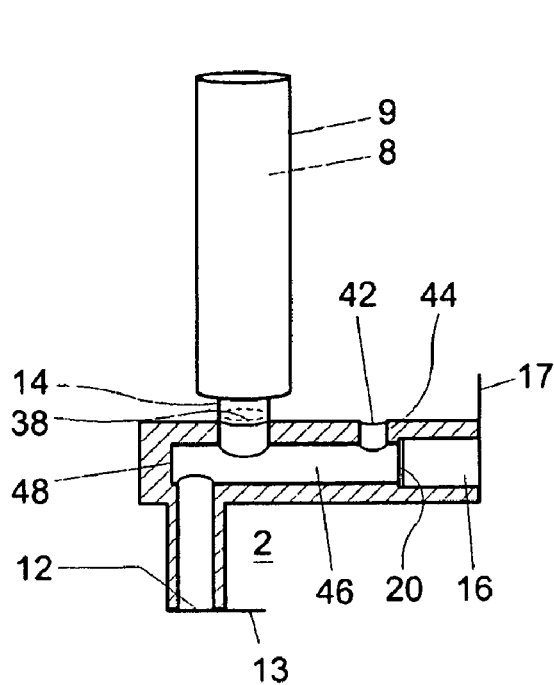
Figure 2C:
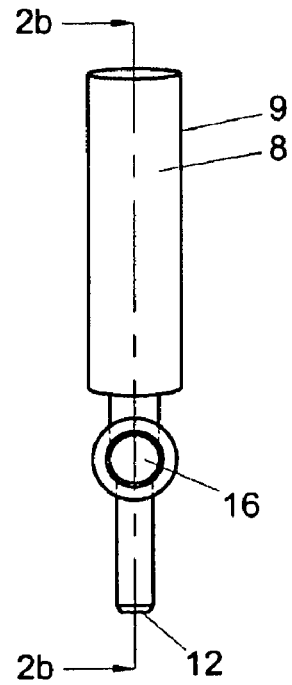

Now, with reference to FIGS. 2a-2c, a second embodiment of a system according to the invention is described. Here, in FIG. 2, parts corresponding to FIG. 1 are provided with the same reference numerals.

As is clearly visible in FIGS. 2b and 2c, an important difference is that now, the restriction 20 forms part of the exchangeable holder 2. Further, it can be seen that the air inlet 42 forms part of the exchangeable holder 2. Here, it also holds, again, that the air inlet opening is in fluid communication with the first mixing chamber downstream of the restriction. In FIG. 1 it applied that the first mixing chamber was provided with an inlet opening through which the fluid flow path 22 extended to the first mixing chamber. This inlet opening was formed, in fact, by the inlet opening 16 of the holder as such. In FIG. 2b it can be seen that the inlet opening 16 of the holder does not form the inlet opening of the first mixing chamber 10. The fact is that the restriction 20 is included downstream of the inlet opening 16. As is clearly visible in FIG. 2b, the exchangeable holder is provided, downstream of the restriction rule 20, with an elongated channel 46 in which, downstream of the restriction 20, first, the air inlet 42 terminates and then the fluid communication 14 of the storage space 8. The actual first mixing chamber 10 is, in fact, located downstream of the restriction, in the channel 46.

Before it can be used, the holder, as shown in FIG. 2b, can be provided with a sealing 17 which seals off the inlet opening 16, which sealing can, however, be removed. Such a sealing can, for instance, be a removable seal 17. The holder is also provided with a sealing which seals off the outflow opening 12, which seal can, however, also be removed. In this example this seal too is provided with a removable seal 13. These removable seals 13, 17 are removed by a user. Then, the exchangeable holder is placed in the apparatus as shown in FIG. 2a. The inlet opening 16 is then connected to the outlet opening 18 of the fluid dispensing device 6 (in FIG. 2a, this connection is not yet effected). Also, as shown in FIG. 2a, the storage space 8 is, once again, placed under the needle 28. Again, a user pushes the button 36 to start the preparation of the beverage. Then, the control device 34 provides that the fluid dispensing unit 32 starts moving the needle 28 in the direction of the arrow Pa, whereby the needle 28 is pierced through a wall of the storage space 8, and that the third fluid is supplied under pressure to the second fluid in the storage space. Thus, combined, the storage space 8 and the needle 28 form part of a dosing device. Through the supply of the third fluid, the pressure in the storage space 8 will increase. As a result, the breakable skin 38 will tear whereupon, upon further supply of the third fluid, the coffee concentrate will be supplied to the first mixing chamber 10 in a dosed manner. The control device 34 also provides that the fluid dispensing device 6 is started. Hence, this will start dispensing hot water under pressure. This may be, for instance, at the moment the fluid dispensing device is still activated or some time after, so that the first mixing chamber is first filled only with concentrate and then also with the hot water. The hot water flows via the outlet opening 18 of the apparatus 4 to the holder 2. Thus, the hot water is supplied under pressure via the inlet opening 16 to the holder 2. In particular, the hot water flows along the fluid flow path 22 in the direction of the restriction 20. In this manner, at the restriction 20, a jet is formed of the hot water. This jet of the hot water spouts in the direction of an inside wall 48 of the mixing chamber 10. As the air inlet opening 42 is included downstream of the restriction 20, as a result of the venturi effect, air will be drawn in via the air inlet opening 42. Together with the jet, the drawn-in air moves in the direction of the inside wall 48. In the first mixing chamber 10, the air and the hot water will come into contact with the concentrate. As the jet impacts on the inside wall 48, whirls are formed in the first mixing chamber resulting in that air, concentrate and hot water are mixed together, all this in a manner comparable to that of the system of FIG. 1. The thus formed beverage with the whipped-in air leaves the first mixing chamber via the outflow opening 12. Thus, a coffee extract with a fine-bubble froth layer is obtained. When the desired amount of beverage is obtained, the control device 34 stops the fluid dispensing device and the control device 34 will also ensure that the third fluid is no longer supplied to the second fluid in the storage space and that the needle 28 is retracted from the respective wall of the storage space so that the used holder can be removed from the apparatus.

The size of the air inlet opening 42 can be completely geared to the type of beverage that is to be prepared. If a different holder is placed in the apparatus, with which another type of beverage than, for instance, coffee is to be prepared, the air inlet, i.e., the size of the air inlet can be adjusted accordingly. For preparing frothed milk based on a milk concentrate, the size of the air inlet 42 can for instance be greater than when coffee extract is to be prepared. For preparing other beverages, with which it is not desired to whip in air, the air inlet 42 can be omitted. It is also possible that the air inlet 42 is provided with an adjustable valve 46 which can be set by, for instance, a user for determining the amount of air that is to be whipped into the beverage. This valve can also be, for instance, set automatically by the apparatus. In the case of, for instance, FIG. 1, the air inlet 42 may be provided with an adjustable valve 50 which is schematically indicated in the drawing. To determine how the valve is to be set for preparing the beverage, the exchangeable holder can be provided with, for instance, a readable code, in the form of, for instance, a bar code or a code stored in a responder known per se. The apparatus is provided with a code reading unit 52 which is connected to the control device 34 by means of a signal wire 54. Via the code reading unit 52, the control device 34 reads a code indicating, for instance, in which manner the valve 50 is to be set. This code can for instance depend on the type of second fluid stored in the holder 2. If a milk concentrate is involved, the code can, for instance, ensure that the valve is opened further than when a coffee concentrate is present. Completely analogously, the apparatus can be designed to also control an adjustable valve 50 of the air inlet 42 when this forms part of the holder as is the case in FIG. 2a. In general, something similar can therefore be used. Also, the fluid dispensing device can dispense, at will, different sorts of first fluids such as steam or water. This choice can for instance be determined by the readable code. If the holder is filled with a concentrate, then, for instance hot water can be dispensed by the fluid dispensing device. If, however, the holder is filled with a beverage such as milk, then, the code of the holder may ensure that the fluid dispensing device dispenses steam so that the milk in the first chamber is mixed with the steam for obtaining hot milk.

Figure 3A:
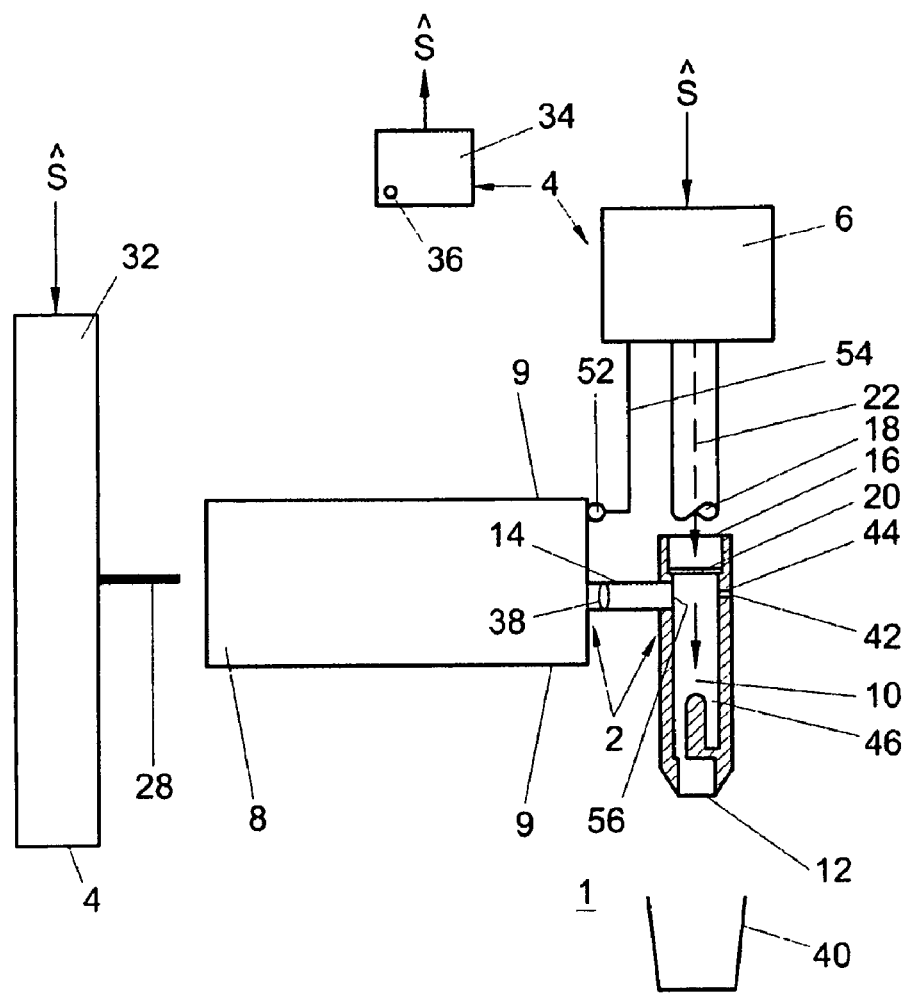
FIG. 3a shows a third embodiment of a system according to the invention provided with a holder according to the invention.
Figure 3B:
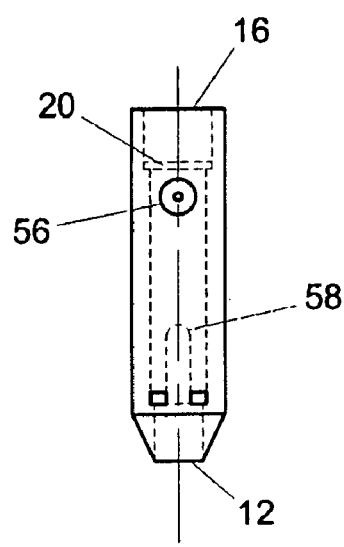

With reference to FIGS. 3a-3c, presently, a third embodiment of the system according to the invention is briefly described. Here, parts corresponding to FIGS. 1 and 2 are, once again, provided with the same reference numerals.

The system according to FIG. 3a corresponds, at least substantially, to the system according to FIG. 2a. The difference resides in the form of the first mixing chamber. Here too, a channel 46 is provided which extends from, for instance, the inlet opening 16 to the outflow opening 12. In this channel 46, which forms part of the fluid flow path 22 mentioned earlier, the air inlet opening 42 terminates via the fluid communication 44. The fluid communication 14 terminates in this channel 46 too. Downstream of the position 56 where the fluid communication 14 terminates in the channel 46, in this channel, in fact, the first mixing chamber 10 is formed. In the first mixing chamber 10, a jet impact element 58 is included. The jet impact element 58 is therefore situated in the first mixing chamber 10 (see FIGS. 3a and 3b). The restriction 20 is directed relative to the jet impact element 58 such that in use, the jet which is generated by the restriction 20, impacts on the jet impact element. Upon impact of the jet on the jet impact element, the liquid is atomized. Simultaneously, by means of the jet, air will be drawn in through the air inlet opening 24. Also, the concentrate in the dosing device 24 is supplied in a dosed manner to the first mixing chamber 10. In the first mixing chamber, the hot water and the extract are mixed together well. As the jet impacts on the jet impact element, the jet is furthermore atomized and air can be whipped in well. Then, the thus formed beverage with whipped-in air leaves the first mixing chamber 10 via the outflow opening 12. Here, the beverage can flow around the jet impact element towards the outflow opening 12. The further operation of the apparatus is comparable to that as is described with reference to the preceding Figures.

Figure 4A:
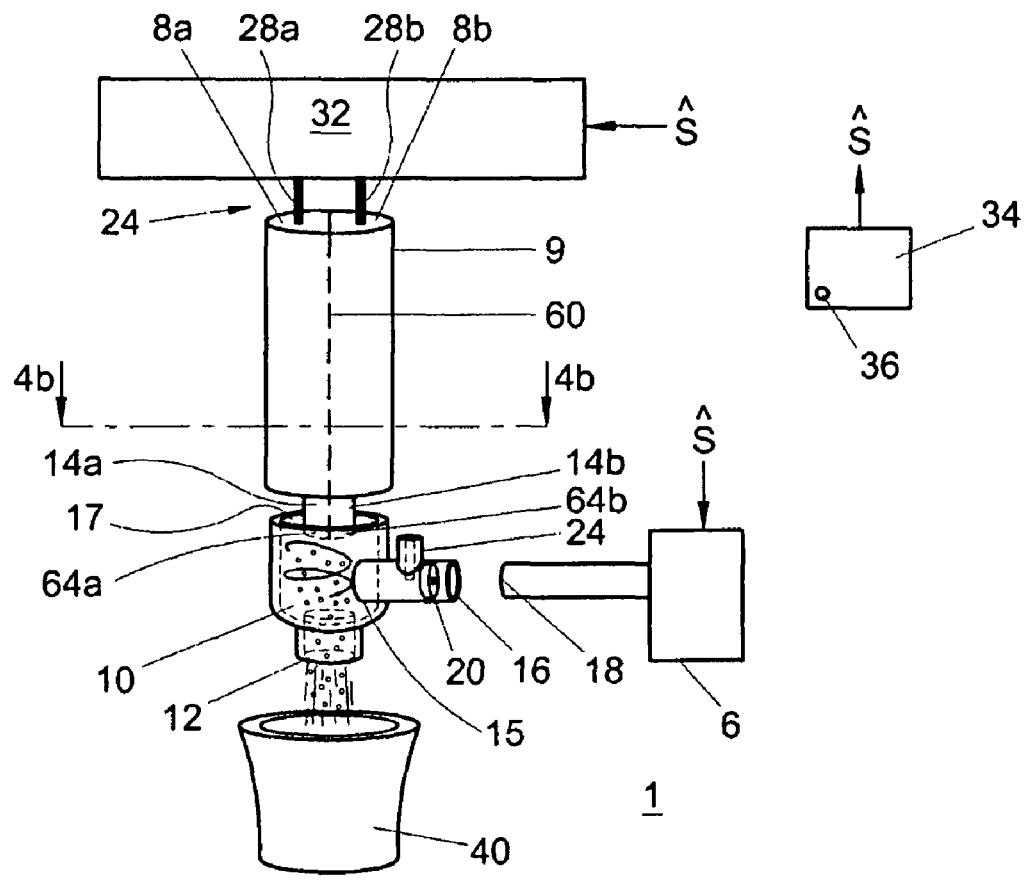
FIG. 4a shows a fourth embodiment of a system according to the invention.
Figure 4B:
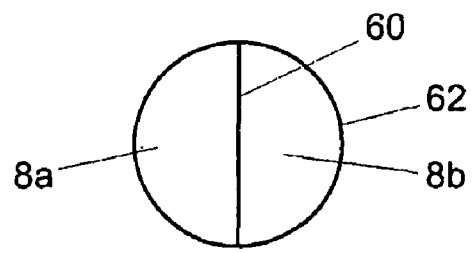

Presently, with reference to FIGS. 4a and 4b, a fourth embodiment of a system according to the invention is described.

In this example, the holder substantially corresponds to what is described with reference to FIG. 1. Presently, however, it holds that the exchangeable holder is provided with a plurality of storage spaces 8a and 8b, in this example two, separated from each other. In this example, this is achieved in that, as shown in FIG. 4a, the storage space 8a is separated from the storage space 8b by means of a partition wall 60. Therefore, the storage space 8a, 8b comprises a continuous outer wall 62 (see FIG. 4b) which encloses a space divided in two by means of the inside wall 60 (see FIG. 4b).

The storage spaces 8a and 8b form at least a part of the dosing device 24. This dosing device 24 is further provided with a needle 28a which, in use, is pierced through a wall of the storage space 8a for supplying the third fluid to the second fluid in the storage space 8s for dispensing the second fluid in a dosed manner to the first mixing chamber. The dosing device 24 is further provided with a needle 28b which, in use, is pierced through a wall of the storage space 8b for supplying the third fluid to the second fluid in the storage space 8b for dispensing the second fluid in a dosed manner to the first mixing chamber. The needles 28a and 28b are connected to a fluid dispensing unit 32. This fluid dispensing unit can be a mutually dependent fluid dispensing unit for the needles 28a and 28b, but can also be an independent fluid dispensing unit for the needles 28a and 28b.

The first storage space 8a terminates, via a first fluid communication 14a, in the first mixing chamber 10. The second storage space 8b terminates, via a fluid communication 14a, in the first mixing chamber 10. The second storage space 8b terminates, via a second fluid communication 14b in the first mixing chamber 10. The fluid communication 14a comprises a through-flow opening 64a while the fluid communication 14b comprises a through-flow opening 64b (see FIG. 4a).

It is noted here that for the sake of clarity, in FIG. 4a, not all reference numerals are included that have been included in FIG. 1a. The operation of the apparatus is as follows.

Completely analogously to what is described hereinabove, the inlet opening 16 and the outflow opening 12 are cleared through removal of the earlier mentioned seals. After this, the holder 2 can be placed in the apparatus 4. The inlet opening 16 is then connected to the outlet opening 18 in a fluid-tight manner. The user starts the process for preparing the beverage by energizing the button 36. As a result, completely analogously to what is described hereinabove, the control device 35 ensures that the fluid dispensing device 6 is started for dispensing, under pressure, the first fluid, in this example hot water. Thus, a jet is generated with the aid of the restriction 20, which jet spouts into the first mixing chamber 10. The control device 34 also provides that the needles 28a and 28b, respectively, are pierced through walls of the storage spaces 8a and 8b, and that the third fluid is supplied under pressure to the second fluid in the storage spaces. In this example, once again, the fluid communication 14a is sealed off by a breakable skin 38a while the fluid communication 14b is closed off by means of a breakable skin 38b. A result of the supply of the third fluid to the storage spaces is that the pressure starts increasing both in the storage space 8a and in the storage space 8b. Here, the breakable skins 38a, 38b may be constructed such that first, the breakable skin 38a opens as it is, for instance, of thinner design. If, then, the storage space 8a is filled with a coffee concentrate, first of all, coffee concentrate will be supplied to the first mixing chamber. Thus, first, coffee is formed which leaves the mixing chamber via the outflow opening 12. When the storage space 8a is at least virtually empty, so that all coffee concentrate has disappeared from the storage space 8a and has been used for preparing coffee, then, the second breakable skin 38b which is, for instance, slightly thicker than the first breakable skin 38a, will tear open. This means that only when at least virtually all coffee concentrate has been dispensed from the storage space 8a to the first mixing chamber, the fluid from the storage space 8b will be supplied to the first mixing chamber in a dosed to manner. The fluid at the storage space 8b can consist of, for instance, milk concentrate. The result is that then, while hot water is being supplied, milk is generated in the first mixing chamber. Furthermore, as a result of the air inlet opening 42, frothing milk will be created. This frothed milk will then end up on top of the coffee extract already present in the mug 40, while the frothed part of the milk will float on top of this. Thus, a perfect cappuccino is obtained.

Further, other variants are conceivable. For instance, the through-flow opening 64a can be designed to be greater than the through-flow opening 64b. When, for instance, the tearable skins 38a and 38b open exactly at a similar pressure and will therefore, in that case, open at least virtually simultaneously, then, when supplying the third fluid, first, the pressure in the storage spaces 8a and 8b will increase to an equal extent. When, thereupon, the two tearable skins 38a, 38b break approximately simultaneously, via the through-flow opening 64a, coffee concentrate will be supplied from the storage space 8a to the first mixing chamber 10. At the same time, milk concentrate will be supplied from the storage space 8b to the first mixing chamber 10. Both concentrates will mix with the jet of the hot water which is supplied by the fluid dispensing device 6 to the first mixing chamber 10. Thus, a beverage is formed consisting of coffee with milk, and which is captured in a mug 40 when the beverage leaves the first mixing chamber 10 via the outflow opening 12. However, as the through-flow opening 64a in this example has a much greater surface than the through-flow opening 64b, the flow rate of the coffee concentrate that is supplied to the first mixing chamber will intially be greater than the flow rate of the milk concentrate that is supplied to the first mixing chamber 10. The result is that, because in this example the volume of the storage space 8a is approximately equal to the volume of the storage space 8b, the storage space 8a is empty first. When the storage space 8a is empty, while the storage space 8b is not yet empty, then, only milk concentrate will be supplied to the mixing chamber 10. As a result, only frothed milk will be formed which, then, ends up on the coffee already received in the mug 40. Again, this frothed milk will float on top of the coffee and form an attractive white froth layer. Thus, again, a cappuccino is formed.

It is also possible that the through-flow opening 64a and the through-flow opening 64b have, for instance, a similar size. It may be such that, for instance, the volume of the storage space 8a is smaller than the volume of the storage space 8b. Here, it can also be provided that the coffee concentrate in the storage space 8a is much stronger, that is, has a higher concentration than milk concentrate in the storage space 8b. As the through-flow openings 64a, 64b are approximately equally great, initially, the flow rate of the coffee concentrate will be approximately equal to the flow rate of the milk concentrate. Here, the starting point is that both concentrates have the same viscosity. The result is that the storage space 8a will be empty sooner than the storage space 8b. This means that when the storage space 8a is empty, only milk concentrate is supplied from the storage space 8b to the first mixing chamber so that, again, after initially, coffee with milk has been formed in the mixing chamber, after that, only milk is formed in the first mixing chamber. Thus, again, a cappuccino is obtained.

It is further also possible that the volume of the storage space 8a and the storage space 8b are approximately equal. The size of the through-flow openings 64a and 64b can be equal too. Now however, it has been provided that the coffee concentrate is less viscous than the milk concentrate. The result is that upon supply of the third fluid, it holds once more that the flow rate of the coffee concentrate from the storage space 8a is greater than the flow rate of the milk concentrate from the storage space 8b. As a result, it holds once more that, initially, both coffee concentrate and milk concentrate are supplied to the first mixing chamber 10 so that coffee is formed that leaves the first mixing chamber via the outflow opening 12 and ends up in the container 40. When, after some time, the storage space 8a is at least virtually empty, this will not yet be the case for the storage space 8b with the milk concentrate. The milk concentrate was, after all, more viscous, so that the flow rate was smaller. That is why thereupon, at least substantially only milk concentrate will be supplied to the mixing chamber 10, so that at least substantially frothed milk is formed which, again, ends up on top of the coffee already present in the container 40 so that, again, a cappuccino is formed. Such variants are all understood to fall within the framework of the invention.

Figure 5A:
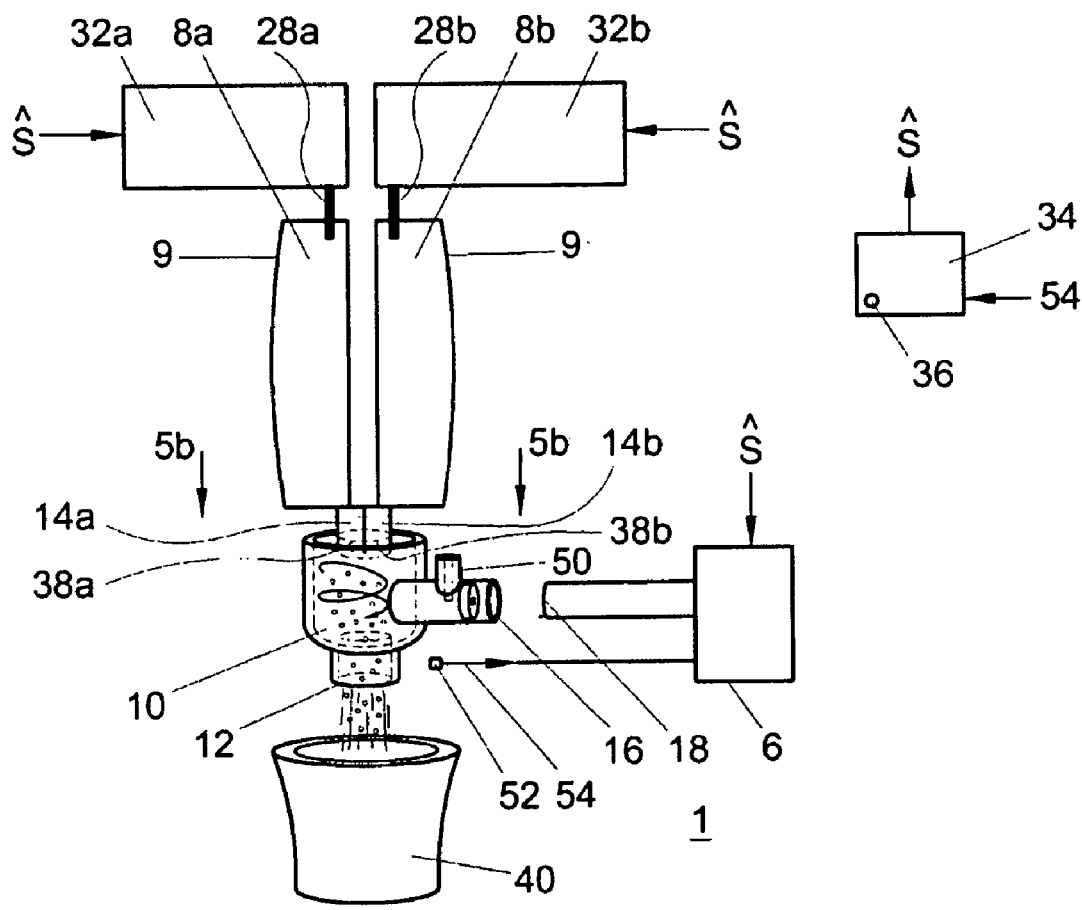
FIG. 5a shows a fifth embodiment of a system according to the invention.
Figure 5B:
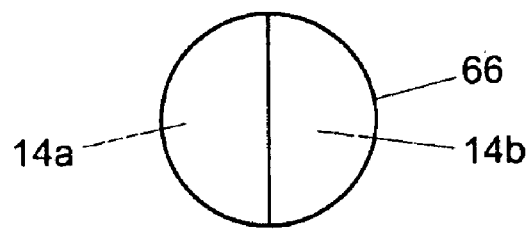

With reference to FIGS. 5a and 5b, a fifth embodiment of a system according to the invention is described. Again, the system according to FIGS. 5a and 5b corresponds at least substantially to that of FIG. 1. Here too, only the differences to the system according to FIG. 1 will be briefly elucidated.

With the system according to FIG. 5 too, the exchangeable holder is provided with a plurality of storage spaces 8a and 8b, in this example two, separated from each other, which are each filled with a fluid. In this example, the storage space 8a is, again, filled with a coffee concentrate, while the storage space 8b is filled with a milk concentrate. In this example, the storage spaces 8a and 8b are each at least substantially identical to the storage space 8 as discussed with reference to FIG. 1. They are, therefore, at least virtually completely separated storage spaces, while no joint wall is involved either, as was the case with FIG. 4. The needle 28a is connected to a fluid dispensing unit 32a and the needle 28b is connected to a fluid dispensing unit 32b, while the fluid dispensing units 32a and 32b are each similar to the fluid dispensing unit 32 or FIG. 4a.

The storage space 8a terminates, via the fluid communication 14a, in the first mixing chamber 10. The storage space 8b terminates, via the fluid communication 14b, in the first mixing chamber 10. It further holds that the fluid communication 14a is, again, sealed off by a breakable skin 38a, while the fluid communication 14b is sealed off by a breakable skin 38b. As can be seen in the drawing, the fluid communications 14a and 14b terminate together in a joint outflow opening 66. An underside of this outflow opening is shown in FIG. 5b. Instead of a breakable skin 38a and 38b, per fluid communication 14a, 14b, also, one breakable skin 38 could be provided for sealing off the joint outflow opening 66. In this example however, this is not the case.

The fluid dispensing units 32a and 32b are designed for independently supplying third fluids to the storage space 8a and 8b. With this, the system is, in fact, provided with a dosing device which comprises a plurality of different, independent dosing devices for supplying second fluids, in a dosed manner, with these different dosing devices from mutually different storage spaces 8a and 8b to the first mixing chamber.

In this manner it is possible to empty the storage spaces 8a and 8b in mutually different paces and/or during mutually different periods. For instance, for preparing a beverage, first, the concentrate can be supplied from the storage space 8a to the first mixing chamber and then, the concentrate can be supplied from the storage space 8b to the first mixing chamber. The result is, for instance, that first, coffee is formed in the first mixing chamber and then milk. Here, further, the air inlet may comprise the valve 50 mentioned. The code reading unit 52 reads, for instance, the code when the inlet opening 16 and the outlet opening 18 are interconnected in a fluid-tight manner. This code 52 comprises information relating to the type of fluids with which the first storage space 8a and the second storage space 8b, respectively, are filled, in this example coffee concentrate and milk concentrate, respectively. If, thus, the holder is intended for the preparation of cappuccino, the control device 34 can determine this on the basis of the read-out code. To this end, when for instance the button 36 is pushed again, the control device will first supply the third fluid, by means of the fluid dispensing unit 32, to the storage space 8a. As a result, first, coffee concentrate will be supplied from the storage space 8a to the mixing chamber 10. Simultaneously, the control device 34 can for instance ensure that the air inlet valve 50 is closed. When the air inlet valve 50 is closed and, with the aid of the fluid dispensing device 6, hot water is supplied under pressure to the restriction 20 (at the same time or just after the dosing of the coffee concentrate has started), a jet of water is generated while no air is drawn in via the air inlet opening 42. The hot water will mix with the coffee extract, while, at least substantially, no air is whipped into the coffee. First, via the outflow opening 12, the coffee extract will be dispensed without this being provided with a fine-bubble froth layer. When, after some time, the storage space 8a is at least virtually empty, the control device 34 will ensure that subsequently, the third fluid is supplied to the second storage space 8b. As a result, the second storage space 8b is slowly emptied. Thus, milk concentrate is supplied to the mixing chamber 10. Now, the control device 34 can provide that the air control valve 50 is opened. As a result, the jet of hot water which is generated with the aid of the restriction 20, draws air along into the first mixing chamber. In this manner, in the first mixing chamber milk is formed with whipped-in air. This milk therefore comprises a fine-bubble froth layer. When, thereupon, the hot milk is supplied via the outflow opening 12 to the coffee extract, the frothed milk will start to float on the coffee extract so that, again, a cappuccino is formed. The fluid dispensing device can continue to dispense hot water when the storage space 8a is empty and, after that, the storage space 8b is emptied. The fluid dispensing device can also be temporarily stopped when a switch is made from dispensing coffee concentrate to dispensing milk concentrate.

Figure 7B:
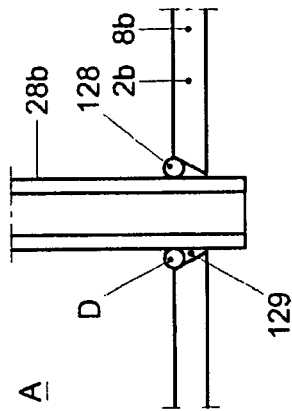
Figure 7A:
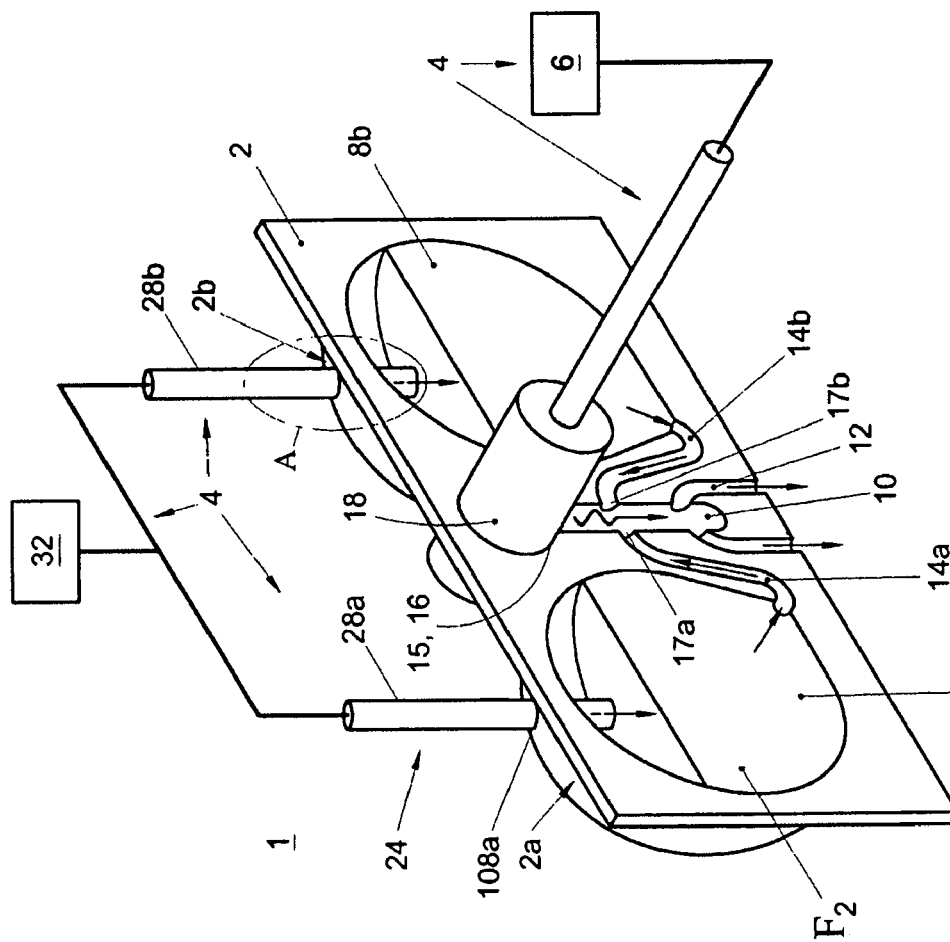
FIG. 7a shows a cutaway perspective view of an eighth embodiment of a system according to the invention.

Reference is now made to FIG. 7a, wherein a schematic, cutaway perspective view of the system 1 according to one embodiment of the invention is shown. FIG. 7 operates in substantially the same manner as the system in FIG. 4a. Therefore, only the differences to the earlier described system 4a will be entered into. In this embodiment of the system 1, the exchangeable holder 2 is provided with two storage space 8a, 8b, situated side by side. The mixing chamber 10 is provided between the two storage space 8a, 8b and extends from top to bottom, while the inlet opening 16 of the mixing chamber is located adjacent an upper side of the mixing chamber. FIG. 7a shows the system 1 in use. The holder 2 is placed in the apparatus 4 and is located substantially vertically in the apparatus 4. Therefore, the upper side 2a of the holder 2 is, in fact, a sidewall 2a of the holder 2 located at an upper side. The outlet opening 18 of the fluid dispensing device 6 forms a fluid communication with the inlet opening 16 which also forms the entrance opening 15 of the mixing chamber 10 for supplying the first fluid therethrough, under pressure, to the mixing chamber 10.

In both storage spaces 8a, 8b, needles 28a, 28b are pierced through the walls 2a, 2b, respectively, which needles form part of the dosing device 24. Through the needles 28a, 28b, a third fluid is supplied under pressure to the storage spaces 8a, 8b, for forcing the second fluid from the storage spaces 8a, 8b, via the entrance openings 17a, 17b to the mixing chamber 10. In this embodiment, wherein the holder is placed vertically in the apparatus 4, the third fluid is supplied to the storage spaces 8a, 8b via a side wall 2a, 2b of the holder 2 located at an upper side. It may be such that in the first storage space 8a, a coffee concentrate is present and, in the second storage space 8b, a milk concentrate, for preparing, for instance, a cappuccino. The dosing device 24 further comprises a fluid dispensing unit 32 which is in fluid communication with the needles 28a, 28b. This fluid dispensing unit can be a mutually dependent fluid dispensing unit for the needles 28a and 28b, but can also be an independent fluid dispensing unit for the needles 28a and 28b.

When the fluid dispensing unit 32 is controlled, for instance the third fluid is supplied through the first needle 28a into the first storage space 8a. In this exemplary embodiment, the third fluid enters the storage space 8a via an uppermost point 108a of the storage space 8a. As a result, in the storage space 8a, the third fluid will always be located above the second fluid F2 in the storage space 8a. Thus, formation of foam of the concentrate present in the storage space 8a is prevented and all the concentrate will be able to leave the storage space 8a. The fluid communication 14a, which connects the storage space 8a to the mixing chamber 10, is connected to a lowest point 114a of the storage space 8a. When the third fluid enters the storage space 8a, the second fluid F2 leaves the storage space 8a simultaneously through this lowest point 114a. As the second fluid leaves the storage space 8a via a lowest point 114a, the third fluid will remain above the second fluid until all second fluid is forced from the storage space 8a. Also, no concentrate will remain behind in the storage space 8a, whereby accurate dosing of the concentrate to the mixing chamber 19 is ensured. FIG. 7a shows that the lowest point 114a and the uppermost point 108a are situated substantially opposite each other. When the concentrate enters the mixing chamber 10, the fluid dispensing device 6 supplies the first fluid to the mixing chamber 10, whereby the first fluid and the coffee concentrate mix and form coffee. Then, the coffee leaves the mixing chamber 10 via the outflow opening 12, of which there are two in this exemplary embodiment of the system 1. After the coffee is led from the mixing chamber 10, the fluid dispensing unit 32 can supply the third fluid via needle 28b into the second storage space 8b. This milk concentrate is forced from the second storage space 8b in the same way as the coffee concentrate from the first storage space 8a. In the mixing chamber 10, through mixing of the first fluid with the milk concentrate, milk is prepared, which, then leaves the mixing chamber 10 through the outflow opening 12 and ends up with the earlier prepared coffee. It needs no further explanation that it is also possible to simultaneously feed the concentrate from both the first storage space 8a and from the second storage space 8b to the mixing chamber 10, so that the cappuccino is already prepared in the mixing chamber 10.

In FIG. 7b, a schematic cross section is shown of a detail A of FIG. 7a. This schematic cross section represents the situation where the needle 28b is pierced through the wall 2b of the second storage space 8b. The needle is provided all around with a sealing element 128. The sealing element 128 comprises an annular element with a substantially round cross section D. The wall 2b of the storage space 8b of the holder 2 comprises a conical opening 129, while the conical opening 129 has a greater diameter at the side of the wall 2b proximal to the sealing element 128. The sealing element 128 drops in the conical opening 129 in the situation where the needle 28b extends through the wall 2b of the holder 2. As a result, a fluid-tight sealing between the storage space 8b and the needle 28b is obtained. Naturally, the sealing element 128 can also have a different shape than the shape shown in this Figure, while, in use, also a fluid-tight sealing is ensured. The needle 28a extending through the wall 2a of the first storage space 8a can, in use, be sealed fluid-tightly in the same manner. Naturally, this sealing can also be provided with other embodiments of the system as represented by the other Figures.

The system according to FIG. 8 to be described hereinafter corresponds to a large extent to the system of FIG. 1. In the following, the differences between the system according to FIG. 1 and the system according to FIG. 8 will be further elucidated.

Figure 8:
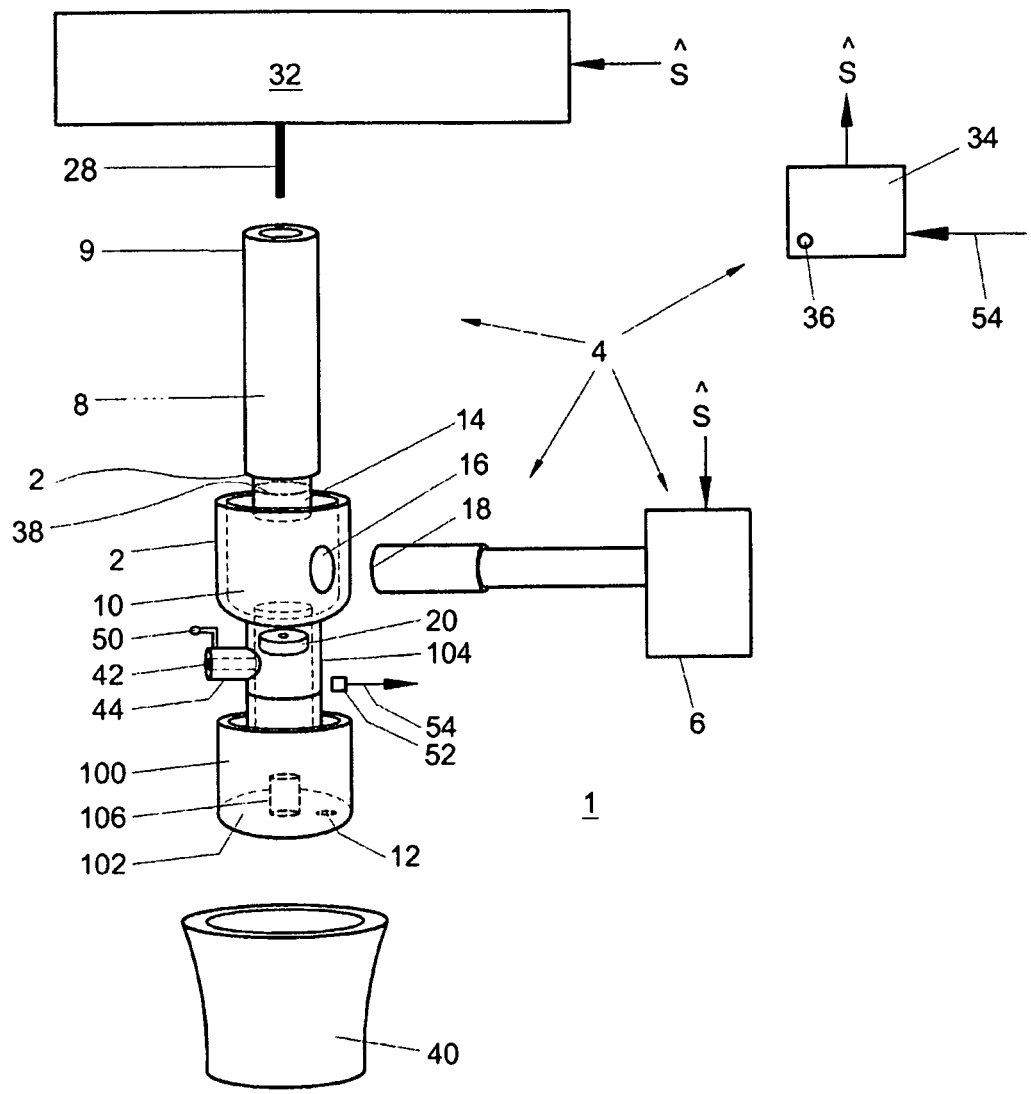
FIG. 8 shows an eighth embodiment of a system according to the invention.

In FIG. 8, it is shown that the system according to the invention can further be provided with a second mixing chamber 100 forming a fluid communication between the first mixing chamber 10 and the outflow opening 12. The outflow opening 12 is located in a bottom 102 of the second mixing chamber 100. The second mixing chamber 100 forms a part of the exchangeable holder 2.

In this example too, it holds that the system is further provided with a restriction 20 which is included in the fluid flow path 21 which extends, via the outlet opening 18, the inlet opening 16 and the first mixing chamber 10 (and, in this example, also via the second chamber 100) from the fluid dispensing device 6 to the outflow opening 12. In this example, the restriction 20 is located in a fluid communication 104 between the first mixing chamber 10 and the second mixing chamber 100. The restriction 20 is designed such that, in use, with the restriction, a jet of the beverage is generated which spouts into the second mixing chamber 100. In this example too, the system is provided with an air inlet opening 42 for supplying air to the beverage in the system.

In this example, the air supply opening 42 terminates via the fluid communication 44 downstream of the restriction 20 and upstream of the second mixing chamber 100 in the fluid flow path 21 (in this example, the fluid communication 104).

The operation of the system is as follows. Completely analogously to what is discussed with FIG. 1, first, the removable seals will be removed and the holder will be connected to the apparatus. By pushing the button 36, the control device 34 will ensure that the dosing device 24 starts dispensing the second fluid to the first mixing chamber 10. Simultaneously or soon after, the control device 34 provides for the fluid dispensing device 6 to start dispensing the first fluid under pressure to the first mixing chamber. In the first mixing chamber, the first fluid and the second fluid will mix together so that the beverage is formed. The first mixing chamber 10 will be gradually filled with the beverage. When the first mixing chamber is full, the pressure in the first mixing chamber will increase in that the dosing device continues to supply the second fluid under pressure to the first mixing chamber 10 and the fluid dispensing device continues to supply the first fluid under pressure, so that the beverage is pressed from the restriction 20 out of the first mixing chamber 10. The result is that with the restriction 20, a jet of the beverage is formed which spouts into the second mixing chamber 100. Also, as a result of the venturi effect, air will be drawn in via the air inlet opening 42. This air too flows to the second mixing chamber 100.

In the second mixing chamber 100 the jet will impact on the bottom 102 for whipping in air. The beverage and the air will mix together so that air is whipped into the beverage. The beverage with the whipped-in air then flows from the second mixing chamber 100 via the outflow opening 12 as the beverage with a fine-bubble froth layer.

In the second mixing chamber 100, a further jet impact element 106 can be included (shown in interrupted lines in FIG. 8) while the restriction 20 is positioned relative to the jet impact element such that in use, the jet impacts on the impact element for whipping air into the beverage as discussed with reference to FIG. 3. Completely analogously to what is described hereinabove, when no air needs to be whipped in, the air inlet opening 42 can be closed or be omitted.

It is noted that each of the embodiments according to FIGS. 1-6 can be provided with a second mixing chamber 100 as is discussed on the basis of FIG. 8.

Further, with the apparatus according to FIG. 8, the air inlet opening 42 can also be positioned as shown in, for instance, FIG. 1. Air is then drawn in and supplied to the first fluid. Via the first fluid, the air then enters the first mixing chamber and will mix with the beverage obtained there. The jet formed with the restriction 20 will then also comprise air. After impact of the jet in the second mixing chamber, again, a beverage with a fine-bubble froth layer will be formed.

In the examples given hereinabove, with the dosing device, the second fluid can be dispensed under pressure to the first chamber. As a result, in the embodiment according to FIG. 8, the beverage cannot flow back into the storage space 8. It is also conceivable that the dosing device is an active dosing device which dispenses the second fluid by means of a pump.

In each of the outlined embodiments, the first fluid can consist of a gas such as steam. In such a case, the second fluid will often already contain a beverage to which the gas is added in the first mixing chamber 10, for instance for heating the beverage. The gas can also comprise carbon dioxide ($CO_2$) for obtaining a carbonated beverage. Also, the first fluid can comprise both a liquid and a gas.

In each of the embodiments according to FIGS. 1-7 further, the restriction can be omitted. However, the first and/or second fluid must then be supplied to the first mixing chamber 10 at a sufficiently great flow velocity in order that the first and second fluid will mix together well. Also, according to the invention, the restriction can be designed such that a mist is generated with the restriction. With the variants according to FIGS. 1-6, this entails that a mist of the first fluid is generated in the first chamber. To this end, the restriction can be manufactured from rubber with a through-feed opening whose diameter can vary slightly when the first fluid is supplied, for atomizing the first fluid. The atomized first fluid and the second fluid mix together whereby the beverage with whipped-in air is obtained. The beverage can then leave the first chamber with a fine-bubble froth layer. If the beverage comprises relatively large air bubbles, these can be stopped or broken by adjusting the size of the outflow opening. Here, the large bubbles cannot pass the outflow opening so that a beverage with a fine-bubble froth layer is dispensed. With the variant according to FIG. 8, this entails that a mist of the beverage is generated in the second chamber 100. As a result, air is whipped into the beverage. The beverage can then leave the second chamber with air whipped in. The beverage can then flow via the outflow opening from the holder with a fine-bubble froth layer as described hereinabove.

In the embodiments outlined hereinabove, the first fluid is supplied to the first mixing chamber during at least a first period and the second fluid is supplied to the first mixing chamber during at least a second period.

Here, the first and second period may start at the same time and end at the same time. It is also possible that the second period starts sooner than the first period. However, other variations are possible too.

Further, the fluid dispensing device 6 can be designed to dispense, at wish, different types of first fluids, such as steam, water, $CO_2$ etc. Once more, the selection hereof can be controlled by the control unit 34 and will often coincide with the type of second fluid or second fluids in the exchangeable holder. Also, if desired, this choice can be set manually or be determined with the aid of the code reading unit 52.

Figure 6A:
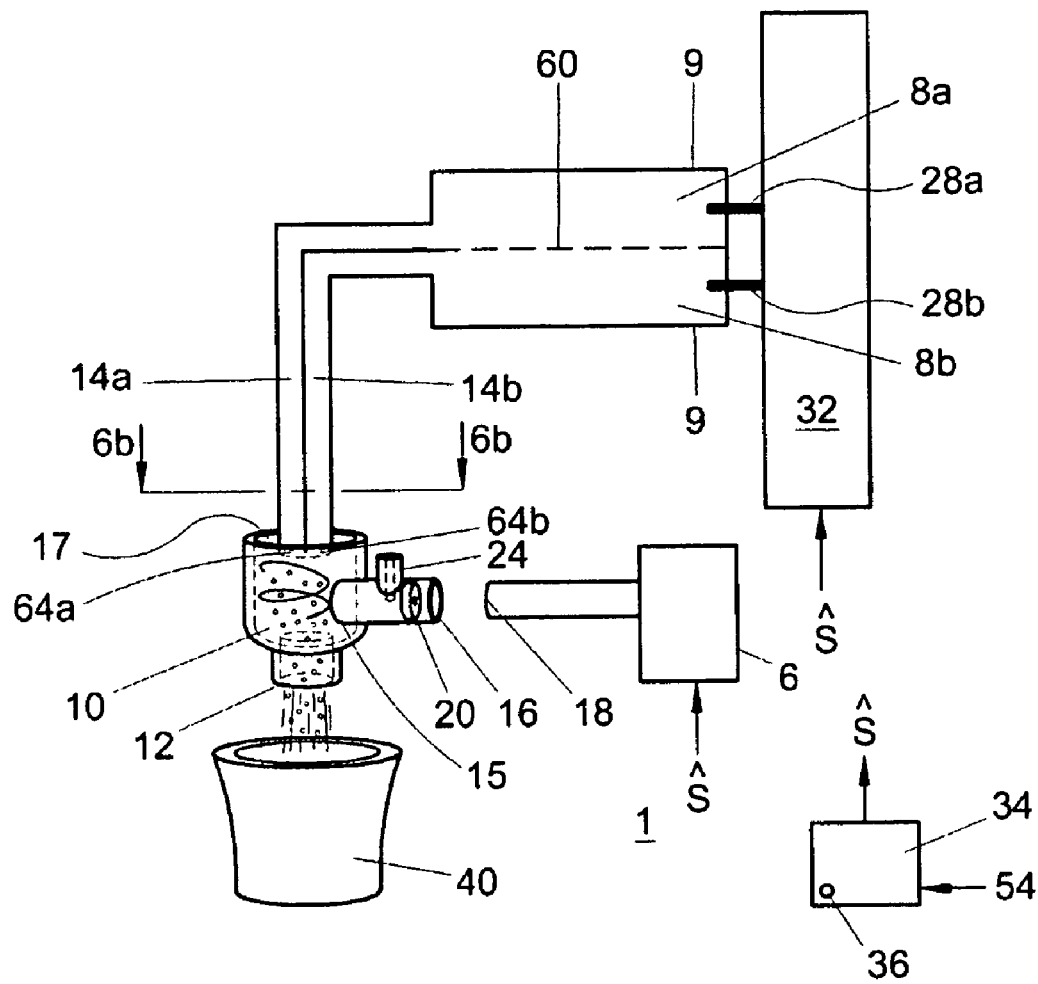
FIG. 6a shows a sixth embodiment of a system according to the invention.
Figure 6B:
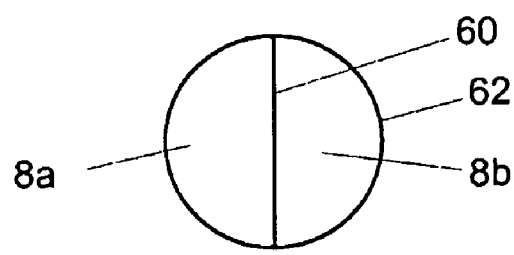

The invention is not limited in any manner to the above outlined embodiments. In the embodiment according to FIG. 4, the storage spaces are side by side. It is also possible that the storage spaces lie one above the other as is schematically shown in FIGS. 6a and 6b. In the embodiment of FIG. 5a, the restriction and the air inlet opening are part of the holder, this in contrast with what is the case in FIG. 1. Naturally, in FIG. 5a, also, the restriction and/or the air inlet can be fixedly connected to the apparatus. The second fluids are, for instance, mixable and/or soluble in the first fluid. In the example, the storage spaces were filled with coffee concentrate and/or milk concentrate. Other fluids, based or not based on concentrate are also conceivable, here, for instance a squash or powder for preparing a lemonade can be considered. The device may further also be provided with additional storage spaces that may be filled with additives such as, for instance, soluble powders or concentrates. These powders too may be supplied to the first mixing chamber by, for instance, forcing out with the aid of a third fluid, or by emptying the respective storage space through squeezing. Here, for instance, flavour enhancers, sugars, cocoa and the like can be involved. Also, milk powder and/or milk creamer can be considered. Generally, it holds that, apart from a liquid such as a concentrate, the second fluid can also be a powder and the like, soluble in the first fluid or mixable with the first fluid, for instance soluble in a liquid such as water. A second fluid in the storage space can also comprise both a concentrate and a powder, in mixed form or not in mixed form.

Such variants are all understood to fall within the framework of the invention. The temperature of the first fluid can vary. The first fluid can, for instance, also consist of water at room temperature or cold water. Also, the temperature of the first fluid supplied to the holder for preparing a beverage can vary over time. Instead of tearable skins, the seals 38 can also comprise valves known per se which are operated by the apparatus, to be opened. The seal 17 can also be designed other than a removable seal. The seal can for instance be provided with a valve which can be operated for instance by hand or by the apparatus. The sealing can also be formed by a tearable seal that tears open under the influence of a mixture of fluid and liquid in the mixing chamber. In the examples mentioned hereinabove, the needle was directly pierced into the wall of the respective storage space. Generally, it is, however, also possible that the needle is pierced in a wall of the holder at a position below which there is a space which is in fluid communication or can be brought in fluid communication with the storage space. If the holder is provided with different storage spaces, a needle can be pierced in the holder for supplying the third fluid to the second fluids in the different storage spaces. Here, the needle is pierced in a wall of the holder at a position below which there is a space which is in fluid communication with the storage spaces. It is, however, also possible that per storage space, a needle is pierced in the wall of the holder. This may be in a wall of the respective storage space themselves, or in a wall of the holder at positions below which are different spaces which are in fluid communication with the different storage space, respectively.

In the preceding examples, the needle was pierced in the holder by activating the dosing device by pushing the button. However, it is also possible that the needle is pierced in the holder manually. The needle may for instance be attached to a lid of the apparatus. Here, the apparatus may be provided with a receiving space for the holder which can be closed off by the lid. By closing the receiving space with the lid, the (at least one) needle can be pierced in the holder.

The volume of the storage space can for instance vary from 5 to 150 ml, more particularly from 6 to 50 ml. A passage opening of the restriction can vary from, for instance, 0.4 to 1.5 mm, more particularly from 0.6-1.3 mm, still more particularly from 0.7-0.9 mm. The pressure at which the fluid dispensing device dispenses the first fluid in use, can vary from 0.6 to 12 bars, more particularly from 0.7 to 2 bars and, preferably, from 0.9 to 1.5 bars. The period during which the first fluid is supplied to the first mixing chamber for preparing the beverage can vary from 2 to 90 seconds, more particularly from 10 to 50 seconds. The size of the air inlet opening, when this is fully opened, can vary from, for instance, 0.005 to 0.5 $mm^2$.

The invention claimed is:

1. A system for preparing a predetermined amount of beverage suitable for consumption, the system comprising:
    an exchangeable holder and an apparatus provided with a fluid dispensing device which is detachably connected to the holder for dispensing at least one amount of at least a first fluid, such as a liquid and/or a gas, in particular such as water and/or steam, under pressure to the exchangeable holder, wherein the exchangeable holder includes:
        at least one storage space which is filled with a second fluid such as a concentrate,
        at least a first mixing chamber,
        at least one outflow opening which is in fluid communication with the first mixing chamber for dispensing the beverage from the first mixing chamber, while, in use, there is at least one fluid communication between the storage space and the first mixing chamber for dispensing the second fluid to the first mixing chamber,
        at least one inlet opening which is detachably connected to an outlet opening of the fluid dispensing device for supplying the first fluid to the first mixing chamber,
    a dosing device which is designed for supplying the second fluid in a dosed manner from the storage space to the first mixing chamber by supplying a third fluid in a controllable manner, under pressure, to the second fluid in the storage space, while the fluid dispensing device is designed for supplying the first fluid under pressure to the first mixing chamber so that in the first mixing chamber the first fluid and the second fluid mix together for obtaining the beverage which, then, leaves the exchangeable holder via the outflow opening;
    wherein the third fluid is a gas.

2. A system according to claim 1, wherein a first fluid flow path along which the first fluid is supplied to the first mixing chamber, is separated from a second fluid flow path along which the second fluid and, optionally, the third fluid are supplied to the first mixing chamber.

3. A system according to claim 1, wherein the first mixing chamber comprises a first entrance opening and a second entrance opening placed at a distance from the first entrance opening, while, in use, the first fluid enters the first mixing chamber via the first entrance opening and the second fluid and/or the third fluid enter the first mixing chamber via the second entrance opening.

4. A system according to claim 3, wherein the at least one fluid communication terminates into the second entrance opening and that the inlet opening is in fluid communication with the first entrance opening.

5. A system according to claim 4, wherein, in use, the third fluid enters storage space via an uppermost point of the storage space, located near a top of the storage space, viewed in vertical direction.

6. A system according to claim 1, wherein the fluid communication which, in use, is provided between the storage space and the mixing chamber, connects the storage space to the mixing chamber at a lowest point, located at a bottom of the storage space, viewed in vertical direction, while, in use, the second fluid leaves the storage space via this lowest point.

7. A system according to claim 6, wherein the fluid communication which, in use, is provided between the storage space and the mixing chamber, springs from a wall of the storage space.

8. A system according to claim 5, wherein, the lowest point and the uppermost point of the storage space are situated substantially opposite each other.

9. A system according to claim 1, wherein, in use, the holder is provided substantially vertically in the system, while, in use, the supply of the third fluid to the storage space takes place via a sidewall of the holder situated at an upper side.

10. A system according to claim 1, further comprising a control device for controlling the dosing device and the fluid dispensing device.

11. A system according to claim 1, wherein the fluid dispensing device and the dosing device can supply the first fluid and the second fluid, respectively, independently of each other, to the first mixing chamber.

12. A system according to claim 1, further comprising a restriction which is included in a fluid flow path which extends, via the outlet opening of the fluid dispensing device, the inlet opening of the holder and the first mixing device, from the fluid dispensing device to the outflow opening.

13. A system according to claim 1, further comprising a restriction which is included in a fluid flow path which extends, via the outlet opening and the inlet opening, from the fluid dispensing device to the first mixing chamber.

14. A system according to claim 13, wherein the restriction is designed such that in use, with the restriction, a jet of the first fluid is generated which spouts into the first mixing chamber.

15. A system according to claim 13, wherein the restriction is designed such that in use, with the restriction, a mist is generated from the first fluid which flows into the first mixing chamber.

16. A system according to claim 14 wherein the dosing device supplies the second fluid in a dosed manner from the storage space to the first mixing chamber while the fluid dispensing device supplies the first fluid under pressure to the fluid flow path.

17. A system according to claim 1, further comprising at least one inlet opening for supplying air to the beverage in the system.

18. A system according to claim 1, further comprising at least one air inlet opening for supplying air to the first mixing chamber so that, in use, air is whipped into the beverage for obtaining a beverage with a fine bubble froth layer.

19. A system according to claim 18, wherein the system is further provided with a second mixing chamber that forms a fluid communication between the first mixing chamber and the outflow opening, and wherein the at least one air inlet opening is in fluid communication with the first mixing chamber downstream of the restriction.

20. A system according to claim 17, wherein the system is further provided with a second mixing chamber that forms a fluid communication between the first mixing chamber and the outflow opening, and wherein the system is provided with the at least one air inlet opening for supplying air to the second mixing chamber.

21. A system according to claim 11, wherein the at least one air inlet opening forms part of the holder.

22. A system according to claim 11, wherein the at least one air inlet opening forms part of the apparatus.

23. A system according to claim 12, wherein the restriction forms part of the holder.

24. A system according to claim 12, wherein the restriction forms part of the apparatus.

25. A system according to claim 1, wherein between the storage space and the first mixing chamber, there is a seal which will open when the pressure applied by the second fluid to the seal increases to above a predetermined value.

26. A system according to claim 1, wherein the exchangeable holder is provided with a plurality of storage spaces, separated from each other, which are each filled with a second fluid.

27. A system according to claim 26, wherein the holder is provided with a plurality of fluid communications which each form a fluid communication between one of the storage space and the first mixing chamber.

28. A system according to claim 26, wherein between each storage space on the one side, and the first mixing chamber on the other side, a seal is present that will open when the pressure that is applied by one of the fluids to the seal increases to above a particular value.

29. A system according to claim 28, wherein at least a number of seals will open at mutually different pressures.

30. A system according to claim 26, wherein the at least two storage spaces are filled with second fluids having a mutually different viscosity.

31. A system according to claim 26, wherein the dosing device is designed for supplying the second fluids in a dosed manner from the storage spaces to the first mixing chamber by means of supplying the third fluid in a controllable manner, under pressure, to the second fluid in the storage spaces for dispensing the second fluids in a dosed manner to the first mixing chamber from the different storage spaces.

32. A system according to claim 30, wherein each fluid communication, via a through-flow opening, forms a connection between one of the storage spaces and the first mixing chamber while the size of a number of the through-flow openings are chosen to be mutually different, for instance for dispensing the fluids from the different storage spaces at mutually different flow rates with the aid of the actuator.

33. A system according to claim 31, wherein the dosing device is designed for supplying the third fluid to the second fluids in the storage space, independently, per storage space.

34. A system according to claim 26, wherein the system is designed for dispensing fluids from at least two storage spaces, at mutually different flow rates and/or during mutually different periods.

35. A system according to claim 17, wherein the at least one air inlet opening is provided with an adjustable valve for setting the size of the air flow.

36. A system according to claim 35, wherein the holder is provided with a code and the apparatus is provided with a code reading unit for reading the code and a control device that controls the apparatus depending on the code read.

37. A system according to claim 36, wherein the control device controls the fluid dispensing device depending on the code read by the code reading unit, for determining the pressure, the amount and/or the temperature of the liquid which, in use, is supplied to the holder.

38. A system according to claim 36, wherein the control device controls the valve depending on the code read.

39. A system according to claim 10, wherein the first mixing chamber is provided with an inside wall while a restriction is positioned such relative to the inside wall that, in use, the jet spouts against the inside wall.

40. A system according to claim 14, wherein in the first mixing chamber, a jet impact element is included while the restriction is positioned relative to the jet impact element such that, in use, the jet impacts on the jet impact element.

41. A system according to claim 1, wherein an inside wall of the first mixing chamber there is an opening which provides the first mixing chamber with a fluid communication to the outflow opening.

42. A system according to claim 1, wherein the fluid dispensing device is detachably connected to the holder for dispensing at least one amount of at least one liquid, such as water, under pressure to the exchangeable holder, while the outflow opening is in fluid communication with the first mixing chamber for dispensing the beverage from the first mixing chamber, the system further being provided with a restriction which is included in a fluid flow path which forms a liquid flow path and which extends via the outflow opening of the fluid dispensing device and the inlet opening of the holder, from the fluid dispensing device to the first mixing chamber, the dosing device being designed for supplying the second fluid in a dosed manner from the storage space to the first mixing chamber while the fluid dispensing device supplies the liquid under pressure to the liquid flow path so that with the restriction, a jet of the liquid is generated which spouts into the first mixing chamber, while in the first mixing chamber, the second fluid and the liquid mix together for obtaining the beverage which, then, leaves the first mixing chamber via the outflow opening.

43. A system according to claim 1, wherein the dosing device is provided with at least one fluid dispensing device for supplying the third fluid under pressure to the second fluid in the storage space.

44. A system according to claim 43, wherein the fluid dispensing device is detachably connected to the holder.

45. A system according to claim 43, wherein the fluid dispensing device forms part of the apparatus.

46. A system according to claim 36, in so far as dependent on claim 9, wherein the control device is designed for controlling the fluid dispensing device.

47. A system according to claim 46, in so far as dependent on claim 10, wherein the control device forms part of the apparatus.

48. A system according to claim 1, wherein the apparatus comprises means cooperating with the holder for supplying, with the apparatus, a third fluid, in a controllable manner, under pressure, to the second fluid in the storage space.

49. A system according to claim 48, wherein the means cooperating with the holder comprise a needle for piercing, in use, through a wall of the holder, more particularly through a wall of the storage space for supplying the third fluid to the second fluid in the storage space.

50. A system according to claim 49, wherein the needle forms part of the apparatus.

51. A system according to claim 43, wherein the fluid dispensing device is a joint fluid dispensing device for different storage spaces, for supplying the third fluid, under pressure, to the different storage spaces.

52. A system according to claim 43, wherein the dosing device is provided with different, respective, fluid dispensing devices for supplying third fluids under pressure to different, respective, storage spaces.

53. An apparatus for use in a system according to claim 1.

54. A system for preparing a predetermined amount of beverage suitable for consumption, the system comprising:
an exchangeable holder and an apparatus provided with a fluid dispensing device which is detachably connected to the holder for dispensing at least one amount of at least a first fluid, such as a liquid and/or a gas, in particular such as water and/or steam, under pressure to the exchangeable holder, wherein the exchangeable holder is provided with includes:
at least one storage space which is filled with a second fluid such as a concentrate,
at least a first mixing chamber,
at least one outflow opening which is in fluid communication with the first mixing chamber for dispensing the beverage from the first mixing chamber, while, in use, there is at least one fluid communication between the storage space and the first mixing chamber for dispensing the second fluid to the first mixing chamber,
at least one inlet opening which is detachably connected to an outlet opening of the fluid dispensing device for supplying the first fluid to the first mixing chamber,
a dosing device which is designed for supplying the second fluid in a dosed manner from the storage space to the first mixing chamber by supplying a third fluid, such as a gas or a liquid, in a controllable manner, under pressure, to the second fluid in the storage space, while the fluid dispensing device is designed for supplying the first fluid under pressure to the first mixing chamber so that in the first mixing chamber the first fluid and the second fluid mix together for obtaining the beverage which, then, leaves the exchangeable holder via the outflow opening;
wherein the dosing device is provided with a needle which, in use, pierces through a wall of the holder, more particularly through a wall of the storage space or through a wall of the holder at a position below which there is a space which is in fluid communication with the storage space, for supplying the third fluid to the second fluid in the storage space.

55. A system according to claim 54, wherein the third fluid is a liquid, in particular a liquid with a specific weight lower than that of the second fluid.

56. A system according to claim 54, wherein the needle is provided all around with a sealing element, for instance a sealing tube or sealing ring, which is designed for cooperating with the wall of the holder, more particularly with the wall of the storage space or with the wall of the holder at a position below which there is a space which is in fluid communication with the storage space, in order to realize a fluid-tight sealing between the wall and the needle.

57. A system according to claim 56, wherein the wall comprises a conically extending opening for receiving, in use, the needle and the sealing element, while the conically extending opening has a greater diameter at a side proximal to the sealing element than at a side remote from the sealing element.

58. A system for preparing a predetermined amount of beverage suitable for consumption, the system comprising:
an exchangeable holder and an apparatus provided with a fluid dispensing device which is detachably connected to the holder for dispensing at least one amount of at least a first fluid, such as a liquid and/or a gas, in particular such as water and/or steam, under pressure to the exchangeable holder, wherein the exchangeable holder is provided with includes:
at least one storage space which is filled with a second fluid such as a concentrate,
at least a first mixing chamber,
at least one outflow opening which is in fluid communication with the first mixing chamber for dispensing the beverage from the first mixing chamber, while, in use, there is at least one fluid communication between the storage space and the first mixing chamber for dispensing the second fluid to the first mixing chamber,
at least one inlet opening which is detachably connected to an outlet opening of the fluid dispensing device for supplying the first fluid to the first mixing chamber,
a dosing device which is designed for supplying the second fluid in a dosed manner from the storage space to the first mixing chamber by supplying a third fluid, such as a gas or a liquid, in a controllable manner, under pressure, to the second fluid in the storage space, while the fluid dispensing device is designed for supplying the first fluid under pressure to the first mixing chamber so that in the first mixing chamber the first fluid and the second fluid mix together for obtaining the beverage which, then, leaves the exchangeable holder via the outflow opening;
wherein the system is further provided with a second mixing chamber that forms a fluid communication between the first mixing chamber and the outflow opening.

59. A system according to claim 58, further comprising a restriction which is included in a fluid flow path which extends, via the outlet opening of the fluid dispensing device, the inlet opening of the holder and the first mixing device, from the fluid dispensing device to the outflow opening, and wherein the restriction is included between the first mixing chamber and the second mixing chamber.

60. A system according to claim 59, wherein the restriction is designed such that, in use, with the restriction, a jet of the beverage is generated that spouts into the second mixing chamber.

61. A system according to claim 59, wherein the restriction is designed such that, in use, with the restriction, a mist of the beverage is generated that flows into the second mixing chamber.

62. A system according to claim 60, further comprising a restriction which is included in a fluid flow path which extends, via the outlet opening and the inlet opening, from the fluid dispensing device to the first mixing chamber, and wherein the at least one air inlet opening terminates via a fluid communication in the fluid flow path.

63. A system according to claim 60, wherein the second mixing chamber is provided with an inside wall while the restriction is positioned relative to the inside wall such that, in use, the jet spouts against the inside wall.

64. A system according to claim 60, wherein in the second mixing chamber, a jet impact element is included while the restriction is positioned relative to the jet impact element such that, in use, the jet impacts on the jet impact element.

65. A system for preparing a predetermined amount of beverage suitable for consumption, the system comprising:

an exchangeable holder and an apparatus provided with a fluid dispensing device which is detachably connected to the holder for dispensing at least one amount of at least a first fluid under pressure to the exchangeable holder, wherein the exchangeable holder comprises:
- at least one storage space which is filled with a second fluid such as a concentrate,
- at least a first mixing chamber,
- at least one outflow opening which is in fluid communication with the first mixing chamber for dispensing the beverage from the first mixing chamber wherein during use there is at least one fluid communication between the storage space and the first mixing chamber for dispensing the second fluid to the first mixing chamber,
- at least one inlet opening which is detachably connected to an outlet opening of the fluid dispensing device for supplying the first fluid to the first mixing chamber;
- a dosing device which is designed for supplying the second fluid in a dosed manner from the storage space to the first mixing chamber by supplying a third fluid being a gas, in a controllable manner, under pressure, to the second fluid in the storage space, while the fluid dispensing device is designed for supplying the first fluid under pressure to the first mixing chamber so that in the first mixing chamber the first fluid and the second fluid mix together for obtaining the beverage which, then, leaves the exchangeable holder via the outflow opening;
- a control device for controlling the dosing device and the fluid dispensing device such that the fluid dispensing device and the dosing device can supply the first fluid and the second fluid, respectively, independently of each other, to the first mixing chamber,
- wherein the dosing device is provided with a needle which, in use, pierces through a wall of the holder at a position below which there is a space which is in fluid communication with the storage space, for supplying the gas to the second fluid in the storage space,
- wherein during use the gas enters the storage space via an uppermost point of the storage space, viewed in vertical direction and wherein the fluid communication which, in use, is provided between the storage space and the mixing chamber, connects the storage space to the mixing chamber at a lowest point, located at a bottom of the storage space, viewed in a vertical direction, while, in use, the second fluid leaves the storage space via this lowest point.

66. An exchangeable holder designed to be connected to an apparatus provided with a fluid dispensing device for dispensing, in use, at least a first fluid, such as a gas and/or liquid, under pressure to the exchangeable holder for preparing a beverage suitable for consumption, the exchangeable holder comprising:
- at least one storage space which is filled with a second fluid, such as a concentrate,
- at least a first mixing chamber,
- at least one outflow opening which is in fluid communication with the first mixing chamber for dispensing the beverage from the first mixing chamber, while, in use, there is at least one fluid communication between the storage space and the first mixing chamber for dispensing the second fluid to the first mixing chamber,
- at least one inlet opening which, in use, is detachably connected to an outlet opening of the fluid dispensing device for supplying the first fluid to the first mixing chamber, the storage space forming part, at least partly, of a dosing device while the holder is designed in a manner such that, in use, a third fluid can be supplied, with the apparatus, in a controllable manner, under pressure, to the second fluid in the storage space for dispensing the second fluid in a dosed manner from the storage space to the first mixing chamber while, in use, the first fluid is also supplied under pressure to the first mixing chamber so that the second fluid and the first fluid mix together for obtaining the beverage which, then, leaves the holder via the outflow opening;
- a restriction which is included in a fluid flow path which extends from the inlet opening of the holder to the outflow opening.

67. A holder according to claim 66, wherein the holder is provided with means cooperating with the apparatus for, in use, supplying the third fluid, with the apparatus, to the second fluid in the storage space while, for instance, the means cooperating with the apparatus comprise at least one locally weakened area of a wall of the holder, more particularly a wall of the storage space or of a wall of the holder at a position below which there is a space which is in fluid communication with the storage space for, in use, piercing a needle of the dosing device through this area for supplying the third fluid to the second fluid in the storage space.

68. A holder according to claim 67, wherein the means cooperating with the apparatus are placed at a distance from the inlet opening.

69. A holder according to claim 66, wherein the first mixing chamber comprises a first entrance opening for supplying the first fluid via the first entrance opening to the first mixing chamber, and a second entrance opening placed at a distance from the first entrance opening for supplying the second fluid and/or the third fluid to the first mixing chamber.

70. A holder according to claim 69, wherein the at least one fluid communication terminates into the second entrance opening and that the inlet opening is in fluid communication with the first entrance opening.

71. A holder according to claim 67, wherein, in use, a supply opening of the storage space, formed by, for instance, a pierced wall of the storage space or an extremity of the fluid communication which is present between a space below a wall of the holder and the storage space of the space, is provided at an uppermost point the storage space, viewed in vertical direction.

72. A holder according to claim 66, wherein the fluid communication which, in use, is provided between the storage space and the mixing chamber of the holder, connects the storage space to the mixing chamber at a lowest point, viewed in vertical direction.

73. A holder according to claim 72, wherein the fluid communication, which, in use, is provided between the storage space and the mixing chamber, springs from a wall of the storage space.

74. A holder according to claim 71, wherein the lowest point and the uppermost point of the storage space are situated substantially opposite each other.

75. A holder according to claim 66, wherein the holder is designed to be placed vertically in the apparatus, while in use, supplying the third fluid to the storage space takes place via a side wall of the holder located at an upper side.

76. A holder according to claim 66, wherein the holder comprises a conically extending opening, for receiving, in use, the needle with a sealing element provided all around the needle, in order to obtain a fluid-tight sealing between the needle and the holder while the conically extending opening has a greater diameter at a side proximal to the sealing element than at a side remote from the sealing element.

77. A holder according to claim 76, wherein the conically extending opening is provided in a wall of the storage space or in a wall of the holder at a position below which there is a space which is in fluid communication with the storage space.

78. A holder according to claim 66, further comprising a restriction which is included in a fluid flow path which extends from the inlet opening to the first mixing chamber.

79. A holder according to claim 78, wherein the restriction is designed such that, in use, with the restriction, a jet of the first fluid is generated which spouts in to the first mixing chamber.

80. A holder according to claim 78, wherein the restriction is designed such that, in use, with the restriction, a mist of the first fluid is generated which flows into the first mixing chamber.

81. A holder according to claim 66, wherein the system is further provided with a second mixing chamber which forms a fluid communication between the first mixing chamber and the outflow opening.

82. A holder according to claim 81, further comprising a restriction which is included in a fluid flow path which extends from the inlet opening of the holder to the outflow opening, and wherein the restriction is included between the first mixing chamber and the second mixing chamber.

83. A holder according to claim 82, wherein the restriction is designed such that, in use, with the restriction, a jet is generated of the beverage, which spouts into the second mixing chamber.

84. A holder according to claim 82, wherein the restriction is designed such that, in use, with the restriction, a mist is generated of the beverage, which flows into the second mixing chamber.

85. A holder according to claim 79, wherein at least one air inlet opening terminates, via a fluid communication, in the fluid flow path.

86. A holder according to claim 66, wherein between the storage space and the first mixing chamber there is a seal which will open when the pressure that is applied by the second fluid to the seal increases to above a predetermined value.

87. A holder according to claim 66, wherein the exchangeable holder is provided with a plurality of storage spaces, separated from each other, which are each filled with a second fluid.

88. A holder according to claim 87, wherein the holder, for the purpose of each storage space, comprises means cooperating with the apparatus for supplying a third fluid, with the apparatus, in a controllable manner, under pressure, to the second fluid in the storage space.

89. A holder according to claim 86, wherein the holder is provided with a plurality of fluid communications which each form a fluid communication between one of the storage spaces and the first mixing chamber.

90. A holder according to claim 86, wherein between each storage space on the one side, and the first mixing chamber on the other side, there is a seal which will open when the pressure which is applied by one of the fluids to the seal increases to above a predetermined value.

91. A holder according to claim 90, wherein at least a number of the seals will open at mutually different pressures.

92. A holder according to claim 80, wherein at least two storage spaces are filled with fluids which have a mutually different viscosity.

93. A system according to claim 89, wherein each fluid communication, via a through-flow opening, forms a connection between one of the storage spaces and the first mixing chamber, while the size of a number of the through-flow openings is chosen to be mutually different, for instance for dispensing the fluids from the different storage spaces at mutually different flow rates with the aid of the actuator.

94. A holder according to claim 86, wherein the holder is designed for dispensing fluids from at least two storage spaces at mutually different flow rates and/or during mutually different periods.

95. A holder according to claim 70, wherein the holder is provided with a code that can be read with a code reading unit.

96. A holder according to claim 92, wherein in the first mixing chamber, a jet impact element is included while the restriction is positioned relative to the jet impact element such that, in use, the jet impacts on the jet impact element.

97. A holder according to claim 70, wherein in an inside wall of the first mixing chamber there is an opening which provides the first mixing chamber with a fluid communication to the outflow opening.

98. A holder according to claim 71, wherein a second mixing chamber is provided with an inside wall while the restriction is positioned relative to the inside wall such that, in use, the jet spouts against the inside wall.

99. A holder according to claim 70, wherein the inlet opening is provided with a removable sealing such as a seal.

100. A holder according to claim 70, wherein the outflow opening is provided with a removable sealing such as a seal.

101. A holder according to claim 70, wherein the fluid dispensing device is designed for dispensing a first fluid in the form of a liquid, under pressure, to the holder, while the outflow opening is in fluid communication with the first mixing chamber for dispensing the beverage from the first mixing chamber, while, in use, the liquid is also supplied under pressure to the mixing chamber so that the second fluid and the liquid mix together for obtaining beverage which, then, leaves the mixing chamber via the outflow opening.

102. A holder according to claim 70, wherein the storage space has walls which are at least partly flexible but not stretchable.

103. An exchangeable holder designed to be connected to an apparatus provided with a fluid dispensing device for dispensing, in use, at least a first fluid, such as a gas and/or liquid, under pressure to the exchangeable holder for preparing a beverage suitable for consumption, the exchangeable holder comprising:
 at least one storage space which is filled with a second fluid, such as a concentrate,
 at least a first mixing chamber,
 at least one outflow opening which is in fluid communication with the first mixing chamber for dispensing the beverage from the first mixing chamber, while, in use, there is at least one fluid communication between the storage space and the first mixing chamber for dispensing the second fluid to the first mixing chamber,
 at least one inlet opening which, in use, is detachably connected to an outlet opening of the fluid dispensing device for supplying the first fluid to the first mixing chamber, the storage space forming part, at least partly, of a dosing device while the holder is designed in a manner such that, in use, a third fluid can be supplied, with the apparatus, in a controllable manner, under pressure, to the second fluid in the storage space for dispensing the second fluid in a dosed manner from the storage space to the first mixing chamber while, in use, the first fluid is also supplied under pressure to the first mixing chamber so that the second fluid and the first fluid mix together for obtaining the beverage which, then, leaves the holder via the outflow opening;

at least one air inlet opening for supplying air to the beverage in the holder.

104. A holder according to claim 103, wherein air is whipped into the beverage for obtaining a beverage with a fine bubble froth layer.

105. A holder according to claim 104, further comprising a restriction which is included in a fluid flow path which extends from the inlet opening to the first mixing chamber, and wherein the at least one air inlet opening is in fluid communication with the first mixing chamber downstream of the restriction.

106. A holder according to claim 103, further comprising a restriction which is included in a fluid flow path which extends from the inlet opening to the first mixing chamber, and wherein the holder is provided with the at least one air inlet opening for supplying air to the second mixing chamber.

107. A holder according to claim 103, wherein the at least one air inlet opening is provided with an adjustable valve for setting the size of the air flow.

108. A holder according to claim 107, wherein the first mixing chamber is provided with an inside wall while the restriction is positioned relative to the inside wall such that, in use, the jet spouts against the inside wall.

109. A holder according to claim 104, wherein in a second mixing chamber, a jet impact element is included while the restriction is positioned relative to the jet impact element such that, in use, the jet impacts on the jet impact element.

* * * * *